US012793986B2

(12) United States Patent
Lee et al.

(10) Patent No.: US 12,793,986 B2
(45) Date of Patent: Nov. 10, 2026

(54) CURRENT COLLECTOR FOR SECONDARY BATTERY AND CYLINDRICAL BATTERY CELL COMPRISING THE SAME

(71) Applicant: LG ENERGY SOLUTION, LTD., Seoul (KR)

(72) Inventors: Yun-Ju Lee, Daejeon (KR); Duk-Hyun Ryu, Daejeon (KR); Kwan-Hee Lee, Daejeon (KR); Sue-Jin Kim, Daejeon (KR); Geun-Ho Park, Daejeon (KR); Seung-Yeon Son, Daejeon (KR); Jin-Su Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 523 days.

(21) Appl. No.: 18/574,666

(22) PCT Filed: Nov. 8, 2022

(86) PCT No.: PCT/KR2022/017470

§ 371 (c)(1),
(2) Date: Dec. 27, 2023

(87) PCT Pub. No.: WO2023/080761

PCT Pub. Date: May 11, 2023

(65) Prior Publication Data

US 2024/0387833 A1 Nov. 21, 2024

(30) Foreign Application Priority Data

Nov. 8, 2021 (KR) ........................ 10-2021-0152634
Nov. 26, 2021 (KR) ........................ 10-2021-0166230
Jul. 19, 2022 (KR) ........................ 10-2022-0089235

(51) Int. Cl.
*H01M 4/75* (2006.01)
*B60L 50/60* (2019.01)
(Continued)

(52) U.S. Cl.
CPC ............... *H01M 4/75* (2013.01); *B60L 50/60* (2019.02); *H01M 10/0587* (2013.01);
(Continued)

(58) Field of Classification Search
CPC .......... H01M 4/75; H01M 4/13; H01M 4/661; H01M 4/70; H01M 4/131; H01M 10/0587;
(Continued)

(56) References Cited

U.S. PATENT DOCUMENTS 6,638,385 B2 * 10/2003 Ishikawa ................ H01G 11/38 156/244.11
2005/0186477 A1 8/2005 Ryu
(Continued)

FOREIGN PATENT DOCUMENTS

CN 102150313 A 8/2011
CN 110476273 A 11/2019
(Continued)

OTHER PUBLICATIONS

Korean Notice of Allowance issued in Korean Application No. 10-2022-0089235, dated Apr. 2, 2026.
(Continued)

*Primary Examiner* — Aiqun Li
(74) *Attorney, Agent, or Firm* — Birch, Stewart, Kolasch & Birch, LLP

(57) ABSTRACT

A current collector for a secondary battery has a material having an elongation of 1.5 to 3.0% and a tensile strength of 25 to 35 kgf/mm$^2$. An electrode, an electrode assembly, cylindrical battery cell, and battery pack are also provided.

16 Claims, 16 Drawing Sheets

(b)

(51) Int. Cl.

| | |
|---|---|
| ***H01M 10/0587*** | (2010.01) |
| ***H01M 50/107*** | (2021.01) |
| ***H01M 50/152*** | (2021.01) |
| ***H01M 50/186*** | (2021.01) |
| ***H01M 50/548*** | (2021.01) |

(52) U.S. Cl.
CPC ....... *H01M 50/107* (2021.01); *H01M 50/152* (2021.01); *H01M 50/186* (2021.01); *H01M 50/548* (2021.01); *H01M 2220/20* (2013.01)

(58) Field of Classification Search
CPC ......... H01M 10/0422; H01M 10/0431; H01M 10/052; H01M 10/525; H01M 50/213; H01M 50/533; H01M 50/538; H01M 50/167; H01M 50/249; H01M 50/559; H01M 50/107; H01M 50/152; H01M 50/186; H01M 50/548; H01M 2004/028; H01M 2220/20; B60L 50/60; Y02E 60/10; Y02P 70/50
See application file for complete search history.

(56) References Cited

U.S. PATENT DOCUMENTS

| | | | |
|---|---|---|---|
| 2005/0244711 | A1 | 11/2005 | Fukui et al. |
| 2005/0287432 | A1 | 12/2005 | Cheon et al. |
| 2009/0186278 | A1 | 7/2009 | Ishizu et al. |
| 2011/0165445 | A1 | 7/2011 | Muraoka et al. |
| 2019/0355993 | A1 | 11/2019 | Lee et al. |
| 2020/0014019 | A1 | 1/2020 | Kim et al. |
| 2020/0295341 | A1 | 9/2020 | Kim et al. |
| 2021/0344033 | A1 | 11/2021 | Park et al. |

FOREIGN PATENT DOCUMENTS

| | | | |
|---|---|---|---|
| CN | 110504453 | A | 11/2019 |
| JP | 9-213339 | A | 8/1997 |
| JP | 2001-28274 | A | 1/2001 |
| JP | 2001-76711 | A | 3/2001 |
| JP | 2002-75386 | A | 3/2002 |
| JP | 2006-12834 | A | 1/2006 |
| JP | 2009-176449 | A | 8/2009 |
| JP | 2016-195036 | A | 11/2016 |
| KR | 10-0560492 | B1 | 3/2006 |
| KR | 10-2020-0041625 | A | 4/2020 |
| KR | 10-2094446 | B1 | 5/2020 |
| WO | WO 2004/004031 | A1 | 1/2004 |

OTHER PUBLICATIONS

Korean Office Action issued in Korean Application No. 10-2022-0089235, dated Feb. 1, 2026.
Korean Office Action issued in Korean Application No. 10-2022-0089235, dated Jul. 5, 2025.
International Search Report for PCT/KR2022/017470 (PCT/ISA/210) mailed on Feb. 27, 2023.

* cited by examiner (a)

(b)

(a)

(b)

CURRENT COLLECTOR FOR SECONDARY BATTERY AND CYLINDRICAL BATTERY CELL COMPRISING THE SAME

TECHNICAL FIELD

The present disclosure relates to a current collector used for a secondary battery and a battery cell comprising the same. The present disclosure also relates to a battery pack and a vehicle containing the battery cell. The present application claims priority to Korean Patent Application No. 10-2021-0152634 filed on Nov. 8, 2021, Korean Patent Application No. 10-2021-0166230 filed on Nov. 26, 2021 and Korean Patent Application No. 10-2022-0089235 filed on Jul. 19, 2022 in the Republic of Korea, the disclosures of which are incorporated herein by reference.

BACKGROUND ART

As technology development and demand for mobile devices and electric vehicles increase, the demand for secondary batteries as an energy source is rapidly increasing. Currently, a widely used secondary battery is a lithium-ion battery, and the operating voltage of a unit battery cell is about 2.5 V to 4.5 V. When a higher output voltage is required, a battery pack is formed by connecting a plurality of battery cells in series, or a battery pack is formed by connecting a plurality of battery cells in parallel according to the charge/discharge capacity required for the battery pack.

As a type of unit battery cell, cylindrical, prismatic, and pouch types are known. A cylindrical battery cell includes a jelly-roll type electrode assembly. The jelly-roll type electrode assembly has a structure in which a positive electrode plate and a negative electrode plate having a sheet shape are wound with a separator interposed therebetween.

FIG. 1 is a plan view illustrating the structure of an electrode plate, and FIG. 2 is a view showing an electrode plate winding process for manufacturing a jelly-roll type electrode assembly.

Referring to FIGS. 1 and 2, the positive electrode plate 10 and the negative electrode plate 11 have a structure in which an active material layer 21 is coated on a sheet-shaped current collector 20, and may include an uncoated portion 22 on one long side along the winding direction X. The electrode assembly is fabricated by sequentially stacking the positive electrode plate 10 and the negative electrode plate 11 together with two separators 12 as shown in FIG. 2 and then winding them in one direction X around the core. In this case, the uncoated portions 22 of the positive electrode plate 10 and the negative electrode plate 11 may be disposed in opposite directions.

The positive electrode plate 10 and the negative electrode plate 11 may include a current collector 20 extended in the winding direction X and an active material layer 21 coated on the upper and/or lower surface of the current collector 20. The end of the current collector 20 is not coated with the active material layer 21 by a predetermined width. In the art, the region on which the active material layer 21 is not coated is called an uncoated portion 22, and the region on which the active material layer 21 is coated is called a coated portion.

The electrode plate manufacturing process includes the steps of coating the active material layer 21 on the current collector 20 to a design thickness, drying the coated active material layer 21, and compressing the active material layer 21 to a desired density through a rolling process using a roller.

FIG. 3 is a schematic diagram illustrating a process of rolling an electrode plate using a roller.

Referring to FIG. 3, the electrode plate 1 coated with the active material layer 21 on the upper and lower surfaces of the current collector 20 is rolled while passing between the pair of rollers 30. Therefore, it can be seen that the deformation force that substantially causes the electrode plate 1 to elongate acts along the longitudinal direction of the electrode plate 1 (identical to the X direction in FIG. 1). When the active material layer 21 is compressed, the coated portion and the uncoated portion 22 elongate to different extents.

Therefore, the actual electrode plate 1 deviates from the ideal shape as shown in FIG. 1. As shown in FIG. 4, unlike the state before compression as in (a), after the rolling process is performed to perform compression as shown in (b), a swell occurs in the longitudinal direction of the electrode plate 1 (the traveling direction of the roller 30), thereby causing a camber phenomenon as shown in FIG. 5. The camber phenomenon refers to a phenomenon in which the electrode plate 1 is bent toward the uncoated portion 22 when the electrode plate 1 is unfolded according to the difference in elongation between the uncoated portion 22 and the coated portion.

The elongation is defined as in Equation 1 below.

$$\text{elongation } (\%) = \text{length after elongation } (L') - \text{length before elongation } (L)/L \times 100 \quad \text{[Equation 1]}$$

In other words, the elongation is expressed as a percentage of the degree of elongation when an object of length L is deformed to length L'. The elongation refers to the rate at which the material is stretched in the tensile test. The larger the elongation, the greater the property of stretching without breaking against an external impact. That is, the elongation is used as a measure of the fracture performance of a material. Therefore, a material with a smaller elongation has a greater tendency to fracture due to an external impact, and a material with a larger elongation has a greater tendency to elongate without being fractured by an external impact.

For reference, the camber length is defined as the maximum value of the amount of deformation measured at each point of the lower end of the electrode plate 1 when the swelled electrode plate 1 is spread out in a straight line. The maximum value corresponds to the amount of deformation (refer to the 'camber length') measured at the end of the rolling process of the active material layer 21 as shown in FIG. 5.

If the electrode plate 1 with a camber is used as it is, it may cause meandering defects during the notching operation of the uncoated portion 22 or the winding process of the electrode plate 1. Also, the meandering defect causes an internal short circuit between the positive electrode plate 10 and the negative electrode plate 11 facing each other with the separator 12 interposed therebetween in the jelly-roll type electrode assembly.

Conventionally, in order to reduce the difference in elongation between the uncoated portion 22 and the coated portion, the amount of active material loading of the coated portion may be reduced or additional heat treatment may be performed on the electrode plate 1 after rolling. However, when the amount of active material loading is reduced, the energy density is lowered. Additional heat treatment complicates the process and increases the cost.

Therefore, in the technical field to which the present disclosure belongs, a technology capable of minimizing the camber phenomenon occurring in the rolling process of the active material layer by controlling the physical properties of the current collector itself is required.

DISCLOSURE

Technical Problem

The present disclosure is designed to solve the problems of the related art, and therefore the present disclosure is directed to providing a current collector for a secondary battery that can alleviate a camber phenomenon in the manufacturing process of an electrode plate by controlling the elongation and tensile strength.

Another object of the present disclosure is to provide an electrode plate including the current collector, and an electrode assembly, a battery cell, a battery pack and a vehicle including the same.

The objects to be solved by the present disclosure are not limited to the above objects, and other objects not mentioned will be clearly understood by those of ordinary skill in the art to which the present disclosure belongs from the following disclosure.

Technical Solution

A current collector for a secondary battery according to the present disclosure to solve the above object comprises a material having an elongation of 1.5 to 3.0% and a tensile strength of 25 to 35 $kgf/mm^2$.

As is well known, the tensile strength and elongation are values obtained by a tensile strength test based on IPC-TM-650. In particular, it may be measured by the IPC-TM-650 (2.4.19) method.

Preferably, the current collector is an aluminum current collector.

The present disclosure also provides an electrode plate for a secondary battery, which comprises the current collector for a secondary battery as described above, and an active material layer on the current collector.

The current collector may have a sheet shape with a short side and a long side and may include an uncoated portion not coated with the active material layer extending along the long side of the current collector.

A width of the electrode plate along the short side of the current collector may be 60 to 110 mm, a length of the electrode plate along the long side of the current collector may be 3 to 5 m, and a camber length of the electrode plate may be less than 20 mm.

Preferably, a length of the uncoated portion measured in a direction along the short side of the current collector is 2 to 20 mm. The length of the uncoated portion is the length measured in the width direction of the current collector. The width direction of the current collector is perpendicular to the longitudinal direction of the current collector.

At least a partial area of the uncoated portion may be divided into a plurality of segments.

At this time, the uncoated portion may be notched in a direction along the short side of the current collector.

Preferably, the uncoated portion of the notched area has no breaking or cracking.

An energy density per unit area of the active material layer may be 1 to 6 $mAh/cm^2$.

The current collector may be an aluminum current collector, and the active material may include a lithium transition metal oxide. As described above, the electrode plate may be a positive electrode plate.

An electrode assembly according to the present disclosure may comprise a first electrode plate, a second electrode plate, and a separator interposed therebetween, the first electrode plate, the second electrode plate, and the separator may be wound in one direction to define a core and an outer circumferential surface of the electrode assembly, wherein each of the first electrode plate and the second electrode plate has a sheet shape having a short side and a long side, wherein at least one of the first electrode plate and the second electrode plate includes a current collector and an uncoated portion not coated with an active material layer extending along the long side of the current collector, wherein at least a part of the uncoated portion is exposed beyond the separator, and wherein the current collector has an elongation of 1.5 to 3.0% and a tensile strength of 25 to 35 kgf/mm2.

Preferably, in the electrode assembly, the current collector may be an aluminum current collector, a width of the first electrode plate or the second electrode plate along aalong the short side of the current collector may be 60 to 110 mm, a length of the first electrode plate or the second electrode plate along the long side of the current collector may be 3 to 5 m, and a camber length of the first electrode plate or the second electrode plate may be less than 20 mm.

In the electrode assembly, the uncoated portion may include a core-side uncoated portion adjacent to the core of the electrode assembly, an outer circumference uncoated portion adjacent to the outer circumferential surface of the electrode assembly, and an intermediate uncoated portion located between the core-side uncoated portion and the outer circumference uncoated portion, and at least a partial area of the intermediate uncoated portion may be divided into a plurality of segments.

Each segment of the plurality of segments may have a shape in which an upper portion has a smaller width than a lower portion.

In one aspect, each segment of the plurality of segments may have a rectangular, trapezoidal, triangular, parallel quadrilateral, semicircular or semi-elliptical structure, and the outer circumference uncoated portion and/or the core-side uncoated portion may have no segments in the uncoated portion.

In another aspect, at least one of sides forming the periphery of the segment may be deformed into a curved shape, and the shape of a vertex thereof may also be deformed into a round shape.

In another aspect, the segment may have a shape in which a lower portion has a greater width than an upper portion, and the width may be gradually and/or stepwise decreased from the lower portion to the upper portion.

The plurality of segments may be bent and overlapped in a plurality of layers in a radial direction of the electrode assembly, for example, toward the core.

No breaking or cracking is included between the plurality of segments.

A cylindrical battery cell according to the present disclosure comprises the electrode assembly as described above; a battery can having an open end, the battery can being configured to accommodate the electrode assembly therein, the battery can being electrically connected to any one of the first electrode plate and the second electrode plate to have a first polarity; a sealing body configured to seal the open end of the battery can; and a terminal electrically connected to another one of the first electrode plate and the second electrode plate to have a second polarity, the terminal having a surface exposed to outside the battery can.

In the cylindrical battery cell, the uncoated portion may include a core-side uncoated portion adjacent to the core of the electrode assembly, an outer circumference uncoated portion adjacent to the outer circumferential surface of the electrode assembly, and an intermediate uncoated portion located between the core-side uncoated portion and the outer circumference uncoated portion, and at least a partial area of the intermediate uncoated portion may be divided into a plurality of segments.

At least a partial area of the intermediate uncoated portion may be bent from the outer circumference toward the core, a cavity may be provided in the core of the electrode assembly, and the cavity may not be blocked by the bent structure of the intermediate uncoated portion.

The cylindrical battery cell may further comprise a current collector plate electrically connected to the uncoated portion of the second electrode plate having the first polarity and configured so that at least a part of an edge of the current collector plate is coupled to a sidewall of the battery can.

The sealing body may include a cap plate having no polarity and a gasket crimped to a the open end of the battery can while surrounding an edge of the cap plate.

The battery can may have a hole in a center portion of a closed surface opposite the open end, and the terminal may be a rivet terminal extending through the hole, the terminal being insulated from the battery can and electrically connected to the first electrode plate to have the second polarity.

The technical problem according to the present disclosure may also be achieved by a battery pack including at least one cylindrical battery cell as described above, and a vehicle including at least one battery pack.

Advantageous Effects

According to one aspect of the present disclosure, the elongation and tensile strength of the current collector are optimally adjusted. Therefore, it is possible to minimize the occurrence of camber in the electrode plate manufactured with the corresponding current collector, and thus it is possible to prevent the occurrence of a meandering defect when a jelly-roll type electrode assembly is manufactured using the corresponding electrode plate.

Since the current collector according to the present disclosure is adjusted to have the optimal elongation and tensile strength, swell does not occur well even when the active material layer is pattern-coated and rolled on a large-area current collector in a strip shape. Therefore, it is easy to slit along the uncoated portion between the pattern-coated active material layers, so it is very suitable for producing a large number of electrode plates, and the produced electrode plates have minimal camber.

The current collector according to the present disclosure is suitable for manufacturing large-sized batteries. In particular, the current collector according to the present disclosure is suitable for manufacturing a cylindrical secondary battery in which a positive electrode uncoated portion and a negative electrode uncoated portion are positioned at the top and bottom of the jelly-roll type electrode assembly, respectively, and the current collector plate is welded to the uncoated portion to have a structure with improved current collection efficiency, namely a so-called tab-less cylindrical secondary battery. This jelly-roll type electrode assembly may be manufactured including the step of notching and bending the uncoated portion. Here, the current collector according to the present disclosure may minimize segment disconnection when notching the uncoated portion, which is good to the notching process.

According to another aspect of the present disclosure, it is possible to reduce the internal resistance of the battery cell and increase the energy density by using the uncoated portion itself protruding from the upper and lower portions of the electrode assembly as an electrode tab.

According to another aspect of the present disclosure, it is possible to prevent a short circuit in the cylindrical battery cell caused by partial deformation of the electrode assembly by improving the structure of the uncoated portion of the electrode assembly so that the electrode assembly and the inner circumferential surface of the battery can do not interfere in the process of forming the beading portion of the battery can.

According to another aspect of the present disclosure, it is possible to prevent tearing of the uncoated portion when the uncoated portion is bent by improving the structure of the uncoated portion of the electrode assembly and it is possible to improve welding strength by sufficiently increasing the number of overlapping layers of the uncoated portion.

According to another aspect of the present disclosure, by improving the structure of the uncoated portion adjacent to the core of the electrode assembly to prevent the cavity in the core of the electrode assembly from being blocked when the uncoated portion is bent, the electrolyte solution injection process and the process of welding the battery can and the current collector plate may be carried out easily.

According to another aspect of the present disclosure, it is possible to provide a cylindrical battery cell having a structure in which an internal resistance is low, an internal short circuit is prevented, and a welding strength of the current collector plate and the uncoated portion is improved, a battery pack and a vehicle including the same.

DESCRIPTION OF DRAWINGS

The accompanying drawings illustrate an exemplary embodiment of the present disclosure and together with the following detailed description, serve to provide further understanding of the technical features of the present disclosure, and thus, the present disclosure is not construed as being limited to the drawings.

BEST MODE

Figure 1:
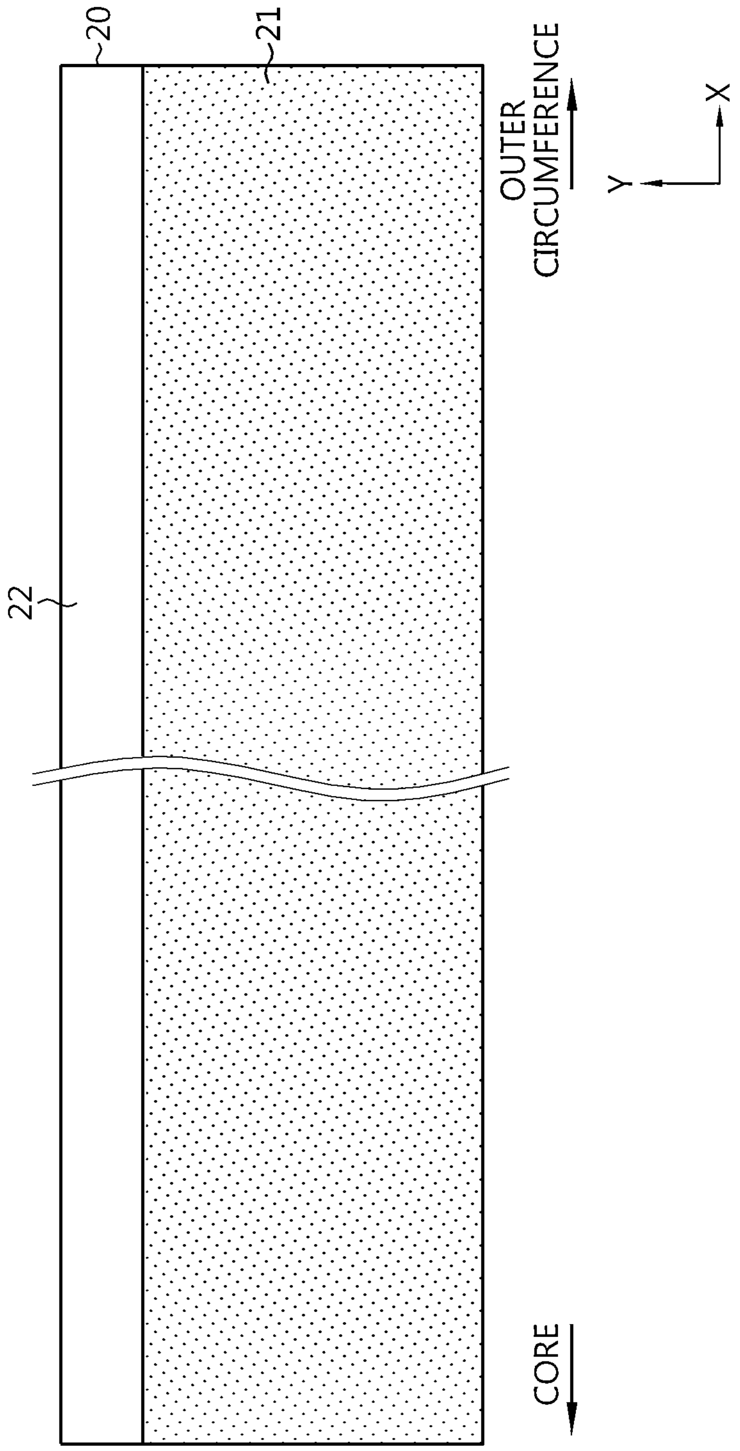
FIG. 1 is a plan view illustrating the structure of an electrode plate.

Hereinafter, exemplary embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations in the drawings are just an exemplary embodiment of the present disclosure, and do not fully represent the technical features of the present disclosure, so it should be understood that a variety of other equivalents and modifications could have been made thereto at the time of filing the patent application.

In addition, in order to help the understanding of the present disclosure, the accompanying drawings are not drawn to scale, but dimensions of some components may be exaggerated. Also, the same reference signs may be assigned to the same components in different embodiments.

The current collector according to the present disclosure is characterized in that the elongation is 1.5 to 3.0%, and the tensile strength is 25 to 35 kgf/mm$^2$. As is well known, the tensile strength and elongation are values obtained by a tensile strength test based on IPC-TM-650. In particular, the tensile strength and elongation may be measured by the IPC-TM-650 (2.4.19) method. The current collector according to the present disclosure is characterized in that the elongation measured by the IPC-TM-650 (2.4.19) method is 1.5 to 3.0%, and the tensile strength is 25 to 35 kgf/mm$^2$.

Considering that the typical elongation of a material used as a conventional current collector is 10 to 15%, the current collector according to the present disclosure has a very low elongation. The tensile strength is a value obtained by dividing the maximum tensile load until the specimen fractures by the cross-sectional area of the specimen before the test in a tensile test of a material. Depending on the method of manufacture, the pure aluminum foil usually has a tensile strength of 50 to 100 Mpa, i.e., 5.1 to 10.2 kgf/mm$^2$ (1 kgf=9.8 N, N/mm$^2$=MPa). Given this point, the current collector according to the present disclosure has high tensile strength.

The current collector according to the present disclosure may be used as a current collector for a secondary battery. The current collector may be coated with an active material layer. The current collector according to the present disclosure may be used as a current collector in the manufacture of a positive electrode plate and a negative electrode plate of a jelly-roll type electrode assembly. Hereinafter, by describing an electrode plate including such a current collector, the current collector according to the present disclosure will be described in more detail.

Figure 6:
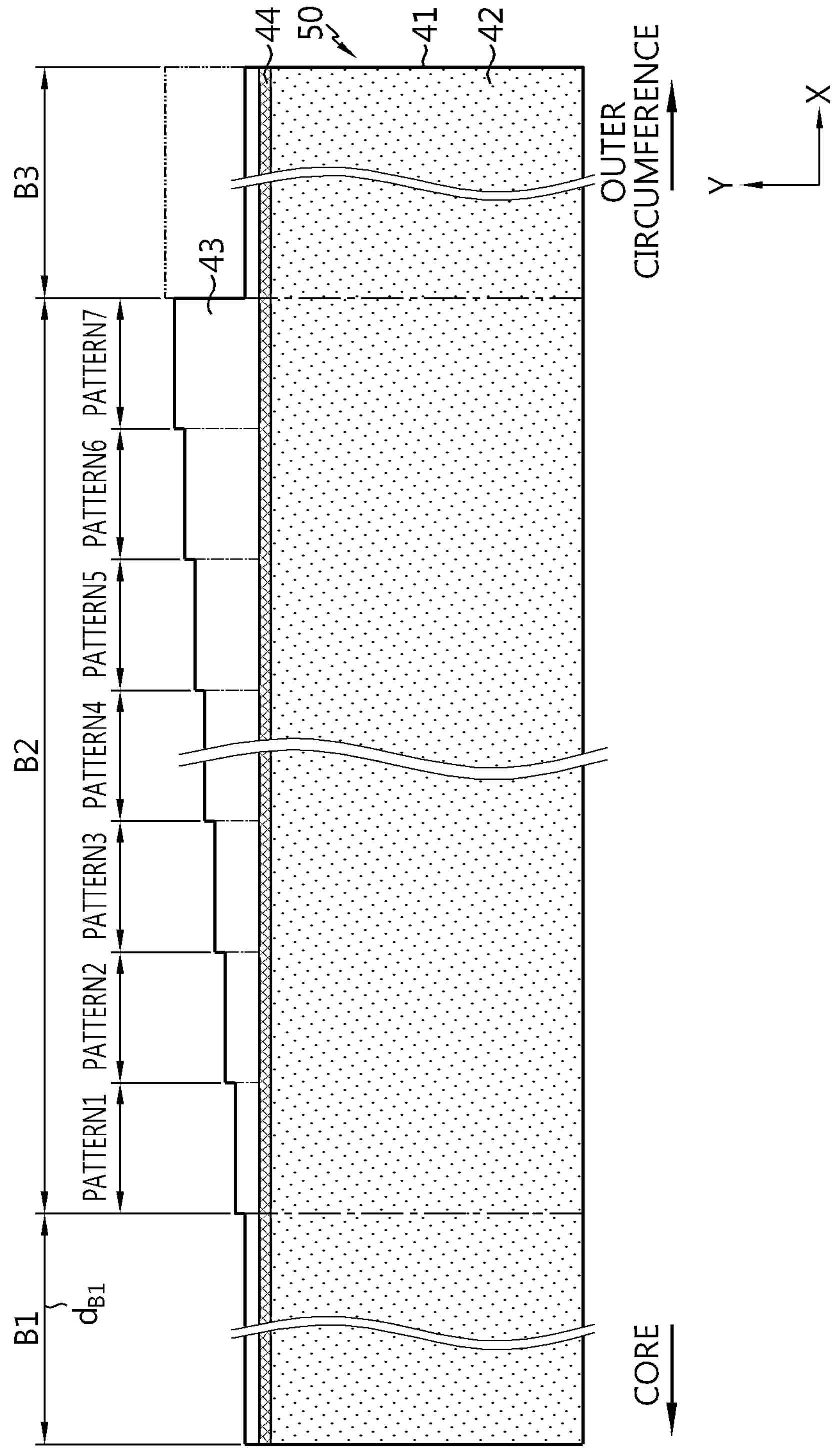
FIG. 6 is a plan view showing the structure of the electrode plate of the first embodiment manufactured with the current collector according to an embodiment of the present disclosure.

FIG. 6 is a plan view showing the structure of the electrode plate of the first embodiment manufactured with the current collector according to an embodiment of the present disclosure.

The electrode plate 50 includes a current collector 41 and an active material layer 42. The current collector 41 is appropriately selected according to the polarity of the electrode plate 50. As a material of the current collector 41, aluminum, copper, nickel, or stainless steel may be used, but the present disclosure is not limited thereto, and metals and metal alloys used as the current collector material may be adopted. For example, when the current collector 41 is an aluminum current collector, it is used as a positive electrode current collector in the secondary battery, the active material layer 42 is a positive electrode active material layer, and the electrode plate 50 is a positive electrode plate. When the current collector 41 is a copper current collector, it is used as a negative electrode current collector in the secondary battery, the active material layer 42 is a negative electrode active material layer, and the electrode plate 50 is a negative electrode plate.

The current collector 41 has a sheet shape including a short side and a long side, and the active material layer 42 is formed on at least one surface of the current collector 41, and may include an uncoated portion 43 at the long side end in the winding direction X. The uncoated portion 43 is an area where the active material is not coated, that is, an area where the active material layer 42 is not formed. An insulating coating layer 44 may be further formed at a boundary between the active material layer 42 and the uncoated portion 43. At least a portion of the insulating coating layer 44 may be formed to overlap a boundary between the active material layer 42 and the uncoated portion 43. The insulating coating layer 44 may include a polymer resin and may include an inorganic filter such as $Al_2O_3$, AlOOH, and $Al(OH)_3$. The insulating coating layer 44 may be omitted.

The electrode plate 50 may be manufactured by coating the active material layer 42 on the current collector 41 to a design thickness, drying it, and compressing the active material layer 42 to a desired density through a rolling process.

At this time, the active material layer 42 is pattern-coated along the longitudinal direction in a strip shape on a large-area current collector and rolled, and then slit in the longitudinal direction along the uncoated portion between the pattern-coated active material layers 42, and cut into a required length in the width direction, thereby manufacturing a large number of electrode plates 50 at once from a large-area current collector. Here, the longitudinal direction of the current collector 41 and the electrode plate 50 is the winding direction X, along which the electrode plate 50 is wound when the electrode plate 50 is used for manufacturing a jelly-roll type electrode assembly. In addition, when the active material layer 42 is rolled using a roller and compressed to a desired density, the roller moves along this direction.

The current collector 41 is a current collector for a secondary battery according to the present disclosure, and as mentioned above, is characterized in that the elongation is 1.5 to 3.0%, and the tensile strength is 25 to 35 $kgf/mm^2$. The width of the electrode plate 50 in the direction along the short side of the current collector 41 may be 60 to 110 mm, and the length in the direction along the long side of the current collector 41 may be 3 to 5 m. The electrode plate 50 is compressed by performing a rolling process on the active material layer 42 formed on the current collector 41, and the camber length after compression is less than 20 mm. Since the camber length is reduced to less than 20 mm, there is no meandering defect during the winding process of the electrode plate 50.

The smaller the elongation, the easier it is to rupture. When the elongation of the current collector 41 is less than 1.5%, the rolling processability of the current collector 41 is lowered, and when the electrode plate 50 prepared by coating the active material layer 42 on the current collector 41 is rolled, breaking or cracking may occur in the current collector 41. The breaking means that the continuity of the material is broken and the broken part is physically completely separated. The cracking means a state in which the continuity of the material is broken only on the surface part and the continuity is maintained in the part therebelow. On the other hand, when the elongation of the current collector 41 exceeds 3.0%, the elongation of the coated portion of the electrode plate 50 (the portion where the active material layer 42 is formed) increases and the camber greatly increases.

If the tensile strength of the current collector 41 is less than 25 $kgf/mm^2$ or more than 35 $kgf/mm^2$, it is impossible to secure the electrode processability of the electrode plate 50, for example, the notching processability in the description with reference to FIGS. 7 to 11 below.

In order to set the elongation and tensile strength of the current collector 41 to a predetermined range as above, a change in the manufacturing process of the current collector 41 and/or a change in the material of the current collector 41 may be made. The elongation may be referred to as the degree of elongation by the pressure applied to the electrode plate when performing rolling using a roller on the electrode plate with the active material layer formed on the current collector. Since the current collector is usually made of metal with good ductility and malleability, it may increase more as the pressure is greater during rolling. The higher the rolling temperature, the greater the elongation. The larger the hardness value of the rolling roller, the greater the elongation. Also, the elongation may also depend on the material and thickness of the current collector. In the present disclosure, the elongation of the current collector 41 of 1.5 to 3.0% refers to the degree of elongation after the rolling process is performed within the common range of the pressure and temperature during rolling, the hardness value of the rolling roller, and the material and thickness of the current collector.

For example, the aluminum foil used as a conventional current collector is prepared by rolling strip-shaped aluminum until it becomes a foil with a target thickness, and the elongation may be changed by adjusting the conditions (pressure, temperature) or frequency of the rolling process. As another example, it may be implemented by controlling the temperature and time of heat treatment additionally performed when manufacturing a copper foil used as a conventional current collector. As another example, when a copper foil used as a conventional current collector is manufactured by electroplating, the amount of organic additives and/or the amount of specific ions included in the electroplating solution may be adjusted. For example, if the amount of organic additives is increased, the tensile strength may be improved and the elongation may be lowered. When the amount of chlorine ions is increased, the elongation is increased.

The camber phenomenon is particularly problematic in the positive electrode current collector, which is a conventional aluminum current collector. According to the present disclosure, the camber phenomenon may be suppressed by using an aluminum current collector that has an elongation of 1.5 to 3.0% and a tensile strength of 25 to 35 $kgf/mm^2$. It is preferable to form an active material layer including lithium transition metal oxide on the current collector and use it as a positive electrode plate. As another example for obtaining the elongation and tensile strength in a predetermined range in such an aluminum current collector, the material constituting the current collector is not pure aluminum, but an aluminum alloy, and the composition change may be used. That is, although Al is used as a main raw material, the elongation and tensile strength may be changed by adjusting the content of other elements included therein. For example, the content of Al in the alloy may be 97.5 to 99.5%. When the content of Al is within the above range, the elongation is decreased and the tensile strength is increased compared to pure aluminum. If the content of Al is less than 97.5%, it is not preferable because there is a fear of lowering the battery properties, and when it exceeds 99.5%, the tensile strength is lowered and there is no anti-camber effect. Other elements that may be included in the aluminum alloy are, for example, Si, Fe, Cu, Mg, Mn, Zn, Ni, Sn, Cr, and the like. For example, if Si or Mg is added, the elongation may be reduced. The addition of Cu may improve the tensile strength. In addition, the elongation and tensile strength of the current collector 41 may be adjusted by those of ordinary skill in the art by other specific means, and the present disclosure is meaningful in suggesting particularly preferred ranges of the elongation and tensile strength.

The current collector 41 may be cut from a large-area current collector substrate. The current collector substrate is used in the manufacture of the electrode plate 50 by treating it as a wound state of a rectangular-shaped thin foil to have a predetermined width and length. The standard width current collector substrate may have a width between 400 and 800 mm. The wide current collector substrate may have a width between 1000 and 1800 mm. This current collector substrate has a length of a few meters to a few hundred meters and may be handled in a state wound on a roll.

The size of the electrode plate 50 may vary depending on the size of the jelly-roll type electrode assembly to be manufactured, and ultimately on the size of the cylindrical battery cell to be manufactured. The size of the electrode plate included in the large cylindrical battery cell having the form factor of 46800 should be larger than the size of the electrode plate included in the small cylindrical battery cell having the form factor of 18650 or 21700. The current collector 41 according to an embodiment of the present disclosure is suitable for use in manufacturing such a large electrode plate.

Here, the form factor means a value indicating the diameter and height of a cylindrical battery cell. The cylindrical battery cell according to an embodiment of the present disclosure may be, for example, a 46110 cell, a 48750 cell, a 48110 cell, a 48800 cell, or a 46800 cell. In the numerical value representing the form factor, the first two numbers indicate the diameter of the cell, the next two numbers indicate the height of the cell, and the last number 0 indicates that the cell has a circular cross section.

In a preferred embodiment, the form factor of the cylindrical battery cell is 46800, the electrode plate 50 is included in a jelly-roll type electrode assembly included in the cylindrical battery cell, the current collector 41 in the electrode plate 50 is an aluminum current collector, and the uncoated portion 43 has the length of 2 to 20 mm. The length of the uncoated portion 43 is measured in the width direction of the current collector 41, that is, in the direction along the short side. The width direction of the current collector 41 is perpendicular to the length direction of the current collector 41. The width of the electrode plate 50 may be 60 to 110 mm, and the length may be 3 to 5 m.

Since the elongation and tensile strength of the current collector 41 according to the present disclosure are optimally adjusted, swell does not occur well even when the active material layer 42 is pattern-coated and rolled on a large-area current collector in a strip shape. Therefore, it is easy to slit along the uncoated portion between the pattern-coated active material layers 42, so it is very suitable for producing a plurality of electrode plates 50.

The current collector 41 may have a rectangular strip shape, and the uncoated portion 43 may also have a strip shape. In the present disclosure, the shape of the uncoated portion 43 is also characterized. The uncoated portion 43 includes a core-side uncoated portion B1 adjacent to the core of the electrode assembly, an outer circumference uncoated portion B3 adjacent to the outer circumference of the electrode assembly, and an intermediate uncoated portion B2 interposed between the core-side uncoated portion B1 and the outer circumference uncoated portion B3. In the first embodiment, the height of the uncoated portion 43 is not uniform and there is a relative difference in the winding direction X. That is, the height (length in the Y-axis direction) of the outer circumference uncoated portion B3 is relatively smaller than that of the core-side uncoated portion B1 and the intermediate uncoated portion B2. As the elongation and tensile strength of the current collector 41 have a predetermined range, there is also an effect of securing suitable processability when tailoring the uncoated portion 43 by placing a difference in height as described above. The uncoated portion 43 may be tailored by a known metal foil cutting process such as ultrasonic cutting or punching. The electrode plate 50, which does not make the height of the uncoated portion 43 uniform and has a relative difference in the winding direction X, is very suitable for manufacturing a cylindrical secondary battery designed so that the positive electrode uncoated portion and the negative electrode uncoated portion are located at the top and bottom of the electrode assembly, respectively, and having a structure in which the current collector plate is welded to the uncoated portion to have improved current collection efficiency, so-called a tab-less cylindrical secondary battery.

The height of the core-side uncoated portion B1 and the outer circumference uncoated portion B3 is equal to or greater than 0, but is relatively smaller than that of the intermediate uncoated portion B2. Also, the height of the core-side uncoated portion B1 and the outer circumference uncoated portion B3 may be the same or different from each other.

Preferably, the height of the intermediate uncoated portion B2 may have a stepped shape that gradually increases from the core toward the outer circumference.

The patterns 1 to 7 are divisions of the intermediate uncoated portion B2 based on the position where the height of the uncoated portion 43 changes. Preferably, the number of patterns and the height (length in the Y-axis direction) and width (length in the X-axis direction) of each pattern may be adjusted to dissipate the stress as much as possible during the bending process of the uncoated portion 43. The stress dissipation is to prevent tearing of the uncoated portion 43.

The width dB1 of the core-side uncoated portion B1 is designed by applying the condition that the cavity of the core of the electrode assembly is not covered when the patterns of the intermediate uncoated portion B2 are bent toward the core.

In one example, the width dB1 of the core-side uncoated portion B1 may increase in proportion to the bending length of the pattern 1. The bending length corresponds to the height of the pattern with respect to the bending point of the pattern.

Preferably, the width dB1 of the core-side uncoated portion B1 may be set such that the radial width of the winding turns formed by the core-side uncoated portion B1 is equal to or greater than the bending length of the pattern 1.

In a specific example, when the electrode plate 50 is used to manufacture an electrode assembly of a large cylindrical cell having a form factor such as 46110, 46800, 48750, 48110, 48800, the width dB1 of the core-side uncoated portion B1 may be set to 180 to 350 mm depending on the diameter of the core of the electrode assembly.

In one embodiment, the width of each pattern may be designed to constitute the same winding turn of the electrode assembly.

In one modification, the height of the intermediate uncoated portion B2 may have a stepped shape that increases and then decreases from the core toward the outer circumference.

In another modification, the height of the outer circumference uncoated portion B3 may be gradually reduced toward the outer circumference.

In another modification, the pattern structure applied to the intermediate uncoated portion B2 may extend to the outer circumference uncoated portion B3 (see dotted line).

On the other hand, as the elongation and tensile strength of the current collector 41 are set within a predetermined range, the camber length after rolling is reduced even if the loading density of the active material layer 42 is sufficient. Accordingly, in the present disclosure, the energy density per unit area of the active material layer 42 may be increased to 1 to 6 mAh/cm$^2$. When the energy density of the active material layer 42 satisfies the above range, it may be suitably used for medium- or large-size high-capacity battery cells, and the loading per electrode weight is lowered, so that the thickness of the electrode may be reduced. The thickness of the active material layer 42 may be 15 μm to 200 μm. As the thickness of the current collector 41 increases, the tensile strength decreases and the elongation increases on the contrary, so the thickness of the current collector 41 may also have an appropriate range in order to set the elongation and tensile strength within a predetermined range. For example, the current collector 41 may have a thickness of 3 μm to 500 μm, too thick is not suitable for winding. For example, it may have a thickness of 7 μm to 20 μm. By forming microtexture on the surface of the current collector 41, the bonding strength with the active material may be strengthened. For example, the current collector 41 may have various forms, such as a film, a sheet, a foil, a net, a porous body, a foam, a nonwoven body, and the like.

Figure 7:
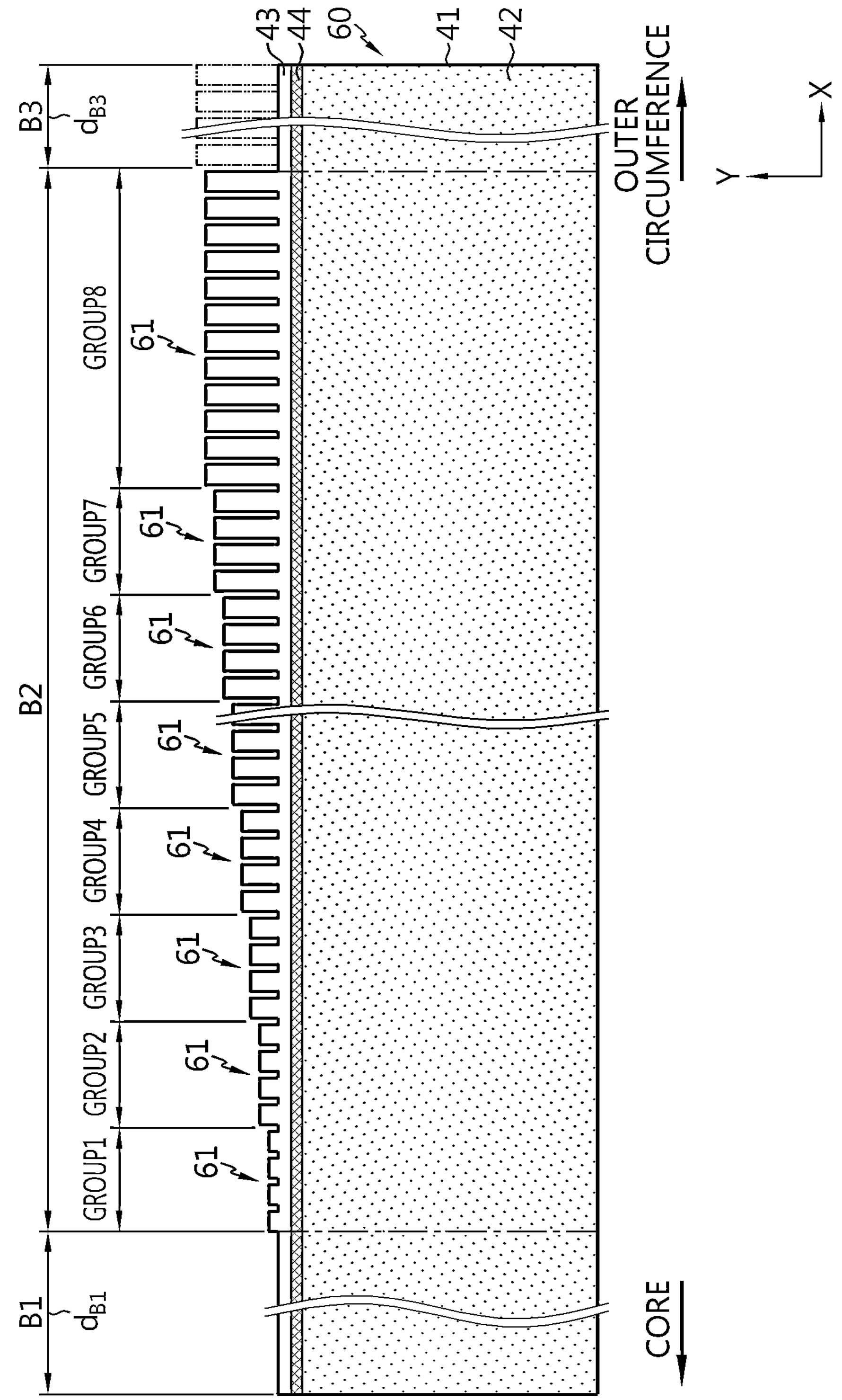
FIG. 7 is a plan view showing the structure of an electrode plate according to the second embodiment of the present disclosure.

FIG. 7 is a plan view showing the structure of an electrode plate according to the second embodiment of the present disclosure.

The electrode plate 60 in FIG. 7 differs from the electrode plate 50 in FIG. 6 only in the shape of the uncoated portion 43, and the rest of the configuration is substantially the same. The electrode plate 60 is more suitable for manufacturing a tab-less cylindrical secondary battery.

The uncoated portion 43 may be divided into a plurality of segments 61 through a notching process as shown in FIG. 7. The segment 61 may be notched with a laser. That is, the uncoated portion 43 may be notched in a direction along the short side of the current collector 41. In addition, the segment 61 may be formed by a known metal foil cutting process such as ultrasonic cutting or punching. In the present disclosure, since the elongation and tensile strength of the current collector 41 are designed, the occurrence of breaking or cracking in the notched area, that is, the uncoated portion 43 of the notched area, may be minimized when the segment 61 is notched. Preferably, no breaking or cracking is included in the uncoated portion 43 of the notched area in the electrode plate 60 according to the present disclosure.

The height of the core-side uncoated portion B1 and the outer circumference uncoated portion B3 may be relatively smaller than that of the intermediate uncoated portion B2. Also, the height of the core-side uncoated portion B1 and the outer circumference uncoated portion B3 may be the same or different.

Preferably, at least a partial area of the intermediate uncoated portion B2 may include a plurality of segments 61. The plurality of segments 61 may increase in height step by step from the core toward the outer circumference.

After winding, the plurality of segments 61 may be bent in a radial direction of the electrode assembly, for example, toward the core and overlapped in a plurality of sheets. By welding the current collector plate to the bent and overlapped segments 61 in this way, it is possible to manufacture a battery cell having an improved current collection efficiency. By setting the elongation and tensile strength of the current collector 41 to a predetermined range, there is an effect that the segments 61 are smoothly bent without tearing or damaging, stress concentration, or breaking of the corresponding region when the segment 61 is bent.

In one aspect, the segment 61 may have a shape in which an upper portion has a smaller width than a lower portion. The segment 61 may have a rectangular, trapezoidal, parallel quadrilateral, triangular, semicircular or semi-elliptical structure. In another aspect, at least one of the sides forming the periphery of the segment may be transformed into a curved shape, and the shape of the vertex may also be transformed into a round shape. In another aspect, the segment may have a shape in which a lower portion has a greater width than an upper portion and the width decreases stepwise and/or gradually from the lower portion to the upper portion.

Figure 8:
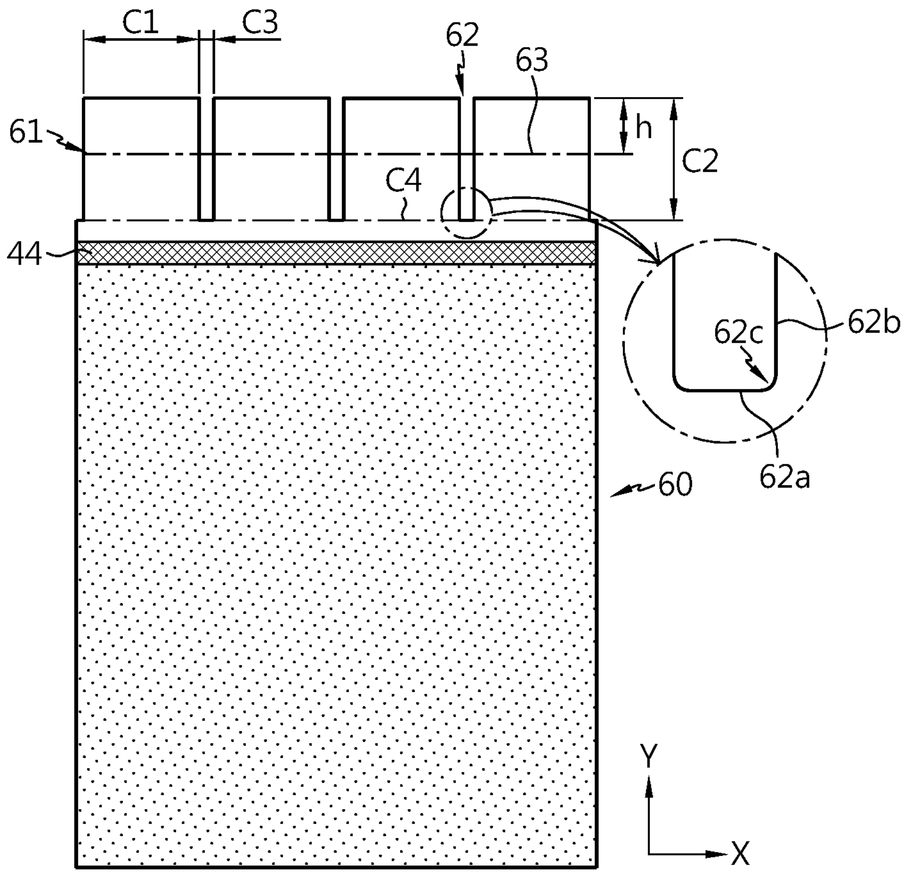
FIG. 8 is a diagram showing the definition of the segment width, height, and spacing pitch in the electrode plate of FIG. 7.

In order to prevent damage to the active material layer 42 and/or the insulating coating layer 44 during bending of the uncoated portion 43, a predetermined gap is preferably placed between the active material layer 42 and the bottom of the cut groove between the segments 61 (C4 of FIG. 8). This is because stress is concentrated near the bottom of the cut groove when the uncoated portion 43 is bent. The gap is preferably 0.2 mm to 4 mm. When the gap is adjusted within the corresponding numerical range, it is possible to prevent damage to the active material layer 42 and/or the insulating coating layer 44 near the bottom of the cut groove by the stress generated during bending of the uncoated portion 43. In addition, the gap may prevent damage to the active material layer 42 and/or the insulating coating layer 44 due to a tolerance during notching or cutting of the segment 61. Preferably, when the electrode plate 60 is wound into the electrode assembly, at least a part of the insulating coating layer 44 may be exposed to the outside of the separator. In this case, the insulating coating layer 44 may support the bending point when the segment 61 is bent.

The plurality of segments 61 may form a plurality of segment groups from the core toward the outer circumference. The width, height, and spacing pitch of segments belonging to the same segment group may be substantially the same.

FIG. 8 is a diagram showing the definition of the width, height, and spacing pitch of the segment 61 in the electrode plate 60 of FIG. 7.

Referring to FIG. 8, the width C1, height C2, and spacing pitch C3 of the segment 61 are designed to prevent abnormal deformation of the uncoated portion 43 while sufficiently increasing the number of overlapping layers of the uncoated portion 43 in order to prevent the uncoated portion 43 from tearing during the bending process of the uncoated portion 43 and improve welding strength. The abnormal deformation means that the uncoated portion below the bending point does not maintain a straight state and is deformed irregularly while sitting down. The number of overlapping layers may be preferably 10 or more.

The segment 61 is bent at the point C4 passing through the lower end of the cut groove 62 or above. The cut groove 62 enables smooth and easy bending of the segment 61 in the radial direction of the electrode assembly.

The width C1 of the segment 61 is defined as the length between two points where two straight lines extending from both sides 62*b* of the segment 61 and a straight line extending from the bottom 62*a* of the cut groove 62 meet. The height C2 of the segment 61 is defined as the shortest distance between the uppermost side of the segment 61 and a straight line extending from the bottom 62*a* of the cut groove 62. The spacing pitch C3 of the segment 61 is defined as the length between two points where a straight line extending from the bottom 62*a* of the cut groove 62 and straight lines extending from two sides 62*b* connected to the bottom 62*a* meet. When the side 62*b* and/or the bottom 62*a* is curved, the straight line may be replaced by a tangent extending from the side 62*b* and/or the bottom 62*a* at the intersection point where the side 62*b* and the bottom 62*a* meet.

Preferably, the width C1 of the segment 61 may be adjusted in the range of 1 to 6 mm. If C1 is less than 1 mm, an area or empty space (gap) is generated where the segments 61 do not overlap each other enough to sufficiently secure welding strength when being bent toward the core. On the other hand, if C1 exceeds 6 mm, there is a possibility that the uncoated portion 43 near the bending point is torn by stress when the segment 61 is bent.

In addition, the height of the segment 61 may be adjusted within the length range of the uncoated portion 43. For example, the length of the uncoated portion 43 is 2 to 20 mm. Preferably, the height of the segment 61 may be adjusted in the range of 2 to 20 mm or in the range of 2 to 10 mm. If C2 is less than 2 mm, an area or empty space (gap) is generated where the segments 61 do not overlap each other enough to sufficiently secure welding strength when being bent toward the core. Since the elongation and tensile strength of the current collector 41 are optimized, it can be said that the limitation of C2 is less compared to the case of using the conventional current collector. In the conventional current collector, the uncoated portion must be lengthened to increase C2, and when the uncoated portion is lengthened, it is difficult to manufacture an electrode plate while maintaining the flatness of the uncoated portion uniformly in the winding direction X. That is, when the height of the uncoated portion increases, swell occurs. However, in the present disclosure, since the current collector 41 with the optimized elongation and tensile strength is used, the range of C2 may be increased while suppressing swell. The larger C2 is, the easier the subsequent bending process is, the larger the overlap area and the welding area, and thus the welding strength may be secured.

In addition, the spacing pitch C3 of the segment 61 may be adjusted in the range of 0.05 to 1 mm. If C3 is less than 0.05 mm, the uncoated portion 43 near the bending point C4 may be torn by stress when the segment 61 is bent. On the other hand, when C3 exceeds 1 mm, an area or an empty space (gap) may be generated in which the segments 61 do not overlap each other enough to sufficiently secure welding strength when segments 61 are bent.

Since the current collector 41 optimized for elongation and tensile strength is used, if the spacing pitch C3 of the segment 61 is adjusted in the range of 0.05 to 1 mm, the segment 61 may be formed without cracking or breaking. After forming the segment 61, when winding the electrode plate 60, cracking may occur due to running tension even if there is no cracking during the formation of the segment 61. In the current collector 41 having elongation and tensile strength in the range suggested by the present disclosure, it is experimentally verified that cracking caused by running tension is prevented if the spacing pitch C3 of the segment 61 is 0.5 mm or more, as explained later with reference to FIG. 9.

A cut groove 62 is interposed between two segments 61 adjacent in the winding direction X. The cut groove 62 corresponds to the space created when the uncoated portion 43 is removed. Preferably, the edge portions of both lower ends of the cut groove 62 have a round shape. That is, the cut groove 62 includes a substantially flat bottom 62*a* and a round portion 62*c*. The round portion 62*c* connects the bottom 62*a* and the side 62*b* of the segment 61. In a modified example, the bottom 62*a* of the cut groove 62 may be replaced with an arc shape. In this case, the sides 62*b* of the segments 61 may be smoothly connected by the arc shape of the bottom 62*a*.

The radius of curvature of the round portion 62*c* may be greater than 0 and less than or equal to 0.5 mm, preferably greater than 0 and less than or equal to 0.1 mm, more preferably 0.01 mm to 0.05 mm. When the radius of curvature of the round portion 62*c* meets the above numerical range, it is possible to prevent cracking from occurring in the lower portion of the cut groove 62 while the electrode plate 60 is running in a winding process or the like, which is experimentally verified as explained later with reference to FIG. 9.

Figure 9:
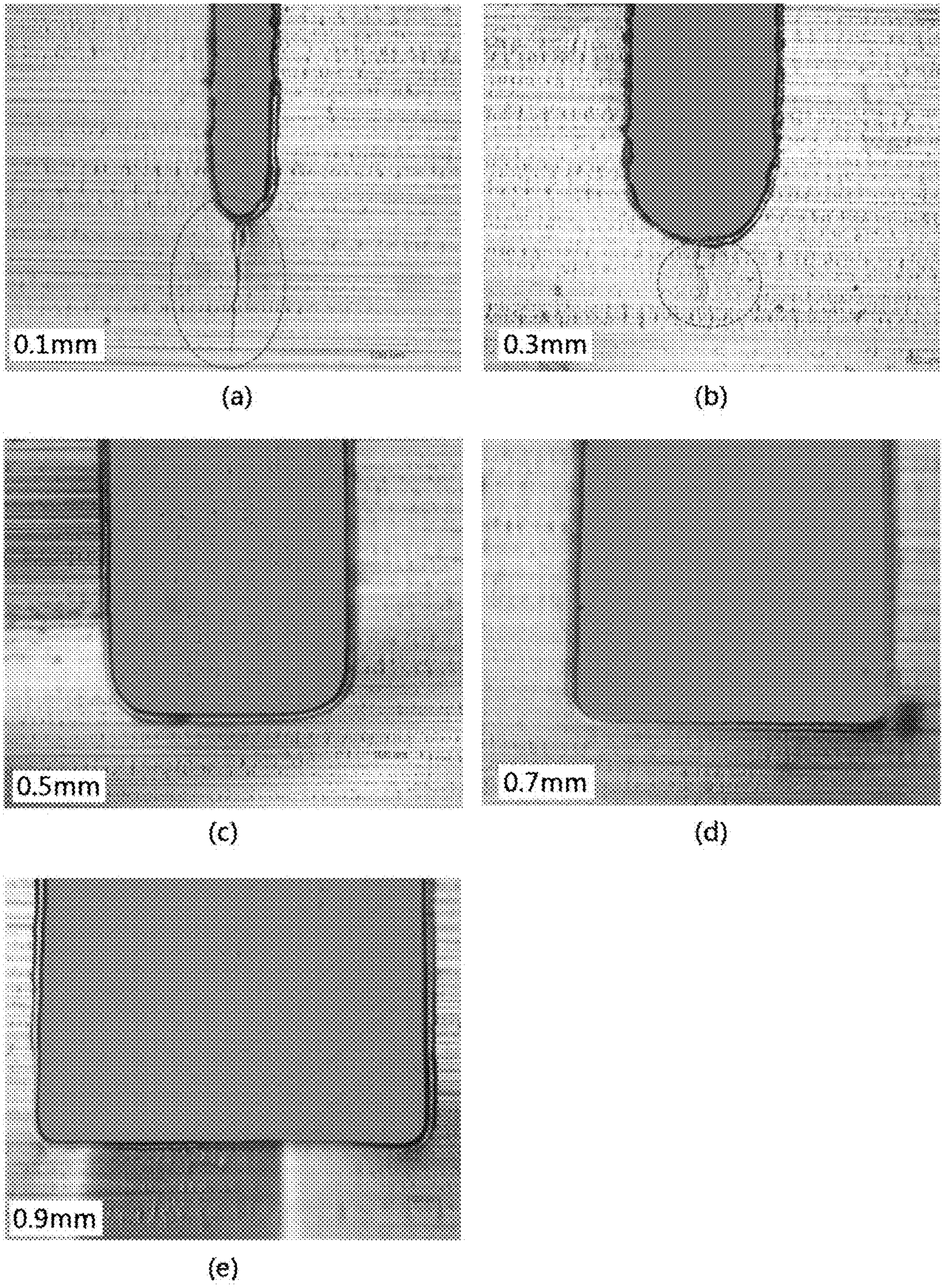
FIG. 9 is a photograph of the result of experiment to investigate running tension-induced cracking according to the spacing pitch and shape of the segment.

FIG. 9 is a photograph of the result of experiment to investigate running tension-induced cracking according to the spacing pitch and shape of the segment.

(a) and (b) of FIG. 9 show that the spacing pitch C3 of the segment is 0.1 mm and 0.3 mm, respectively, and cracking occurs due to running tension (cracking sites are indicated by dotted circles). In addition, (a) and (b) show that when the bottom 62*a* of the cut groove 62 has an arc shape, the maximum stresses of 14.4 MPa and 10.9 MPa occur at the center of the bottom 62*a*, respectively. Cracking occurs in the region where this maximum stress occurs.

(c), (d), and (e) of FIG. 9 show that the spacing pitch C3 of the segment is 0.5 mm, 0.7 mm, and 0.9 mm, respectively, and cracking does not occur due to running tension. In particular, (c), (d), and (e) show that when the cut groove 62 includes a substantially flat bottom 62*a* and a round portion 62*c*, the maximum stress of 10.3 MPa occurs at the bottom 62*a* in (c), and the maximum stress of 9.5 MPa and 8.5 MPa occurs in the round portion 62*c* in (d) and (e), respectively. This maximum stress is not only small compared to (a) and (b), but also do not cause cracking. Therefore, it can be seen that the spacing pitch C3 of the segment is preferably 0.5 mm or more.

In particular, in (d) and (e) where the spacing pitch C3 is greater than 0.5 mm so that the distinction between the bottom 62*a* and the round portion 62*c* becomes more clear, the maximum stress is not concentrated on the bottom 62*a* but spreads toward the round portion 62*c*, so that the bottom 62*a* rather acts as a stress relief area, so it is found that it is more excellent in terms of preventing the occurrence of cracking. In addition, in (d) and (e) where the radius of curvature of the round portion 62*c* is 0.02 mm, the maximum stress reaching 14.4 MPa in the same state as (a) can be reduced to 9.5 MPa and 8.5 MPa, respectively, so it can be seen that it is very preferable in terms of preventing the occurrence of cracking.

Referring back to FIG. 7, the width dB1 of the core-side uncoated portion B1 is designed by applying a condition that the segment 61 of the intermediate uncoated portion B2 does not cover the cavity of the core of the electrode assembly when being bent toward the core. The cavity of the core is formed at the place where the winding center used in the electrode assembly winding process is removed, and this cavity is used as the passage through which the electrolyte solution is injected. However, when the corresponding passage is closed, it is difficult to inject the electrolyte solution. Accordingly, the width dB1 of the core-side uncoated portion B1 may be determined such that the core-side uncoated portion B1 adjacent to the core of the electrode assembly is bent and do not close the cavity in the core of the electrode assembly completely or significantly.

In one example, the width dB1 of the core-side uncoated portion B1 may increase in proportion to the bending length of the segment 61 of the group 1. The bending length corresponds to the height of the segment 61 with respect to the bending point 63 (FIG. 8). Referring to FIG. 8, C4 represents the lowest bending point. The bending point may be set appropriately at the top of C4. Regarding the bending point, C4 is the lowest point at which bending can be made, and the bending point may move upwards than shown. The bending length is the length from the lowest point of the bending portion to the top of the segment 61. Specifically, the bending point may be set at a predetermined point of the height C2 of the segment 61 with respect to C4. The predetermined point may be set to prevent the stress occurring during bending of the segment 61 from causing physical damage to the active material layer 42 or the insulating coating layer 44 and to sufficiently secure the number of overlapping layers in the radial direction when the segment 61 is bent in the direction opposite to the electrode assembly so that sufficient welding strength is secured when the current collector plate is welded to the area where the segment 61 is bent.

Preferably, the predetermined point may be set to a height of at least 20% or more, at least 30% or more, at least 40% or more, at least 50% or more, at least 60 or more, at least 70% or more, or at least 80% or more, based on the height C2 of the segment 61.

In a specific example, when the electrode plate 60 is used to manufacture an electrode assembly of a large cylindrical battery cell having a form factor such as 46110, 46800, 48750, 48110, 48800, etc., the width dB1 of the core-side uncoated portion B1 may be set to 180 to 350 mm depending on the diameter of the core of the electrode assembly.

According to the present disclosure as above, by improving the structure of the uncoated portion 43 adjacent to the core of the electrode assembly to prevent the cavity in the core of the electrode assembly from being blocked when the uncoated portion 43 is bent, the electrolyte solution injection process and the process of welding the battery can and the current collector plate may be carried out easily.

In one embodiment, the width of each segment group may be designed to constitute the same winding turn of the electrode assembly.

Here, the winding turn may be counted based on the end of the core-side uncoated portion B1 when the electrode plate 60 is in a wound state.

In another modification, the width of each segment group may be designed to constitute at least one winding turn of the electrode assembly.

In another modification, the width and/or height and/or spacing pitch of the segments 61 belonging to the same segment group may increase or decrease gradually and/or stepwise and/or irregularly within the group.

In the example shown in FIG. 7, the groups 1 to 8 are only examples of a segment group. The number of groups and the number of segments 61 included in each group may be adjusted so that the segments 61 overlap in a plurality of layers to maximize the stress distribution in the bending process of the uncoated portion 43 and sufficiently secure welding strength.

In another modification, the height of the outer circumference uncoated portion B3 may be decreased gradually or stepwise. Also, the segment structure of the intermediate uncoated portion B2 is expandable to the outer circumference uncoated portion B3 (refer to the dotted line). In this case, the outer circumference uncoated portion B3 may also include a plurality of segments like the intermediate uncoated portion B2. In this case, the segment of the outer circumference uncoated portion B3 may have a width and/or a height and/or a spacing pitch larger than that of the intermediate uncoated portion B2.

In a specific example, when the electrode plate 60 is used to manufacture an electrode assembly of a large cylindrical battery cell having a form factor such as 46110, 46800, 48750, 48110, 48800, etc., eight groups of segments may be formed. Preferably, the width dB1 of the core-side uncoated portion B1 may be 180 to 350 mm. The width of the group 1 may be 35 to 40% of the width of the core-side uncoated portion B1. The width of the group 2 may be 130 to 150% of the width of the group 1. The width of the group 3 may be 120 to 135% of the width of the group 2. The width of the group 4 may be 85 to 90% of the width of the group 3. The width of the group 5 may be 120 to 130% of the width of the group 4. The width of group 6 may be 100 to 120% of the width of group 5. The width of the group 7 may be 90 to 120% of the width of the group 6. The width of the group 8 may be 115 to 130% of the width of the group 7.

The reason that the width of the groups 1 to 8 does not show a uniform increase or decrease pattern is that the width of the segment gradually increases from the group 1 to the group 8, but the number of segments included in the group is limited to an integer number. Accordingly, the number of segments may be reduced in a specific segment group. Therefore, the width of the group may show an irregular change pattern as in the above example from the core toward the outer circumference.

The segment structure of the intermediate uncoated portion B2 is also applicable to the core-side uncoated portion B1. However, if the segment structure is applied to the core-side uncoated portion B1, when the segment 61 of the intermediate uncoated portion B2 is bent according to the radius of curvature of the core, the end of the core-side uncoated portion B1 may be bent toward the outer circumference, which is so-called reverse forming. Accordingly, it is preferable that the core-side uncoated portion B1 has no segment structure.

As the elongation and tensile strength of the current collector 41 have a predetermined range, when the uncoated portion 43 is segmentally structured as described above, the present disclosure has an effect of ensuring very suitable processability, such as notching processability. Since there is no breaking or cracking in the notched area, the structural robustness of the electrode plate 60 and the electrode assembly including the same is ensured, and unnecessary electrical contacts or current paths are not generated.

This electrode plate 60 is very suitable for manufacturing a tab-less cylindrical secondary battery. Therefore, the current collector 41 according to the present disclosure and the electrode plate 60 including the current collector 41 are very suitable for manufacturing a large-sized battery such as a cylindrical battery cell having a form factor of 46110, 48750, 48110, 48800, 46800, or the like.

Figure 10:
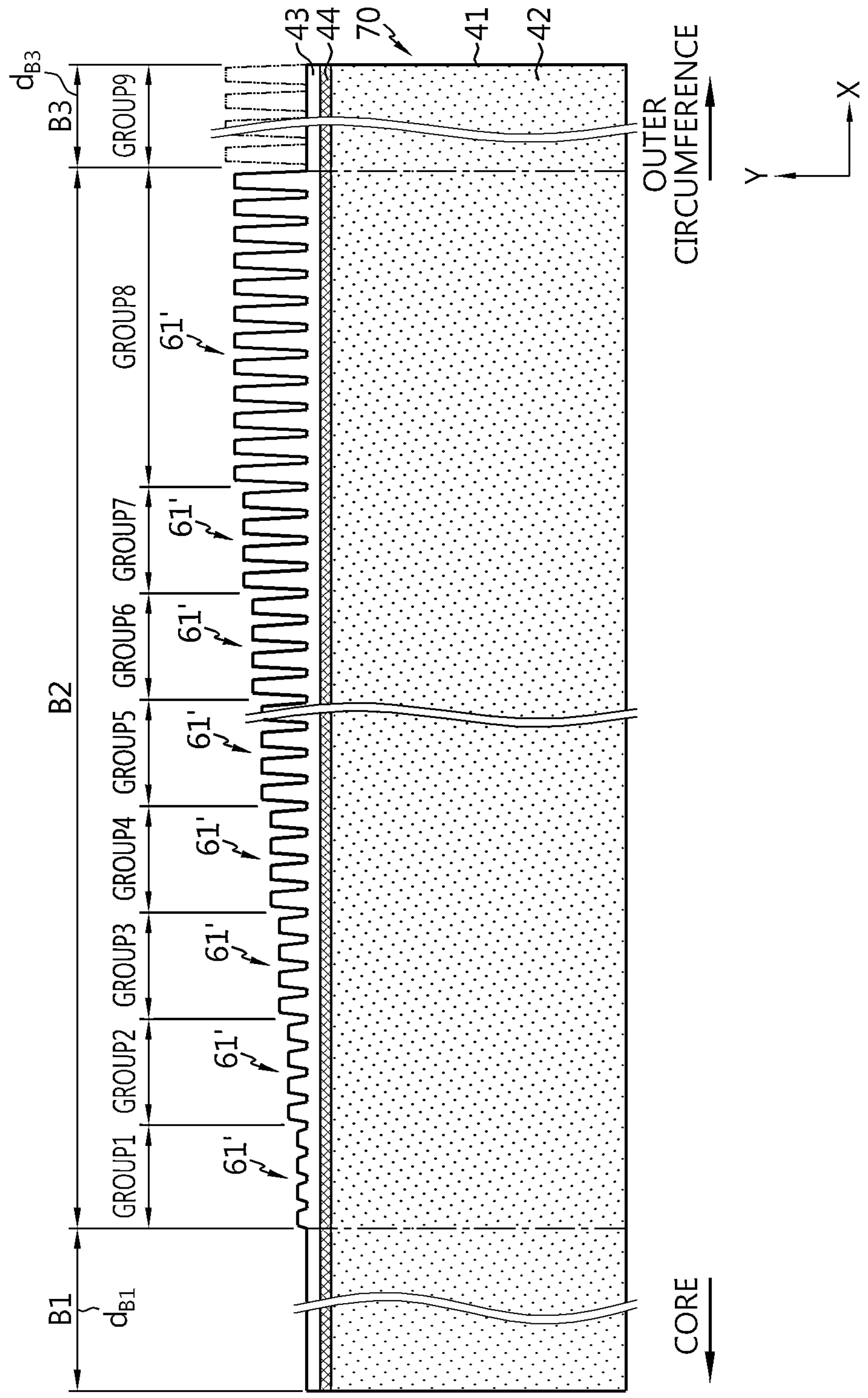
FIG. 10 is a plan view showing the structure of the electrode plate according to the third embodiment of the present disclosure.

FIG. 10 is a plan view showing the structure of the electrode plate according to another embodiment of the present disclosure.

Referring to FIG. 10, the electrode plate 70 of FIG. 10 has substantially the same configuration as the electrode plate 60 of FIG. 7, except that the shape of the segment 61' is changed from a rectangle to a trapezoid compared to the electrode plate 60 of FIG. 7.

Figure 11:
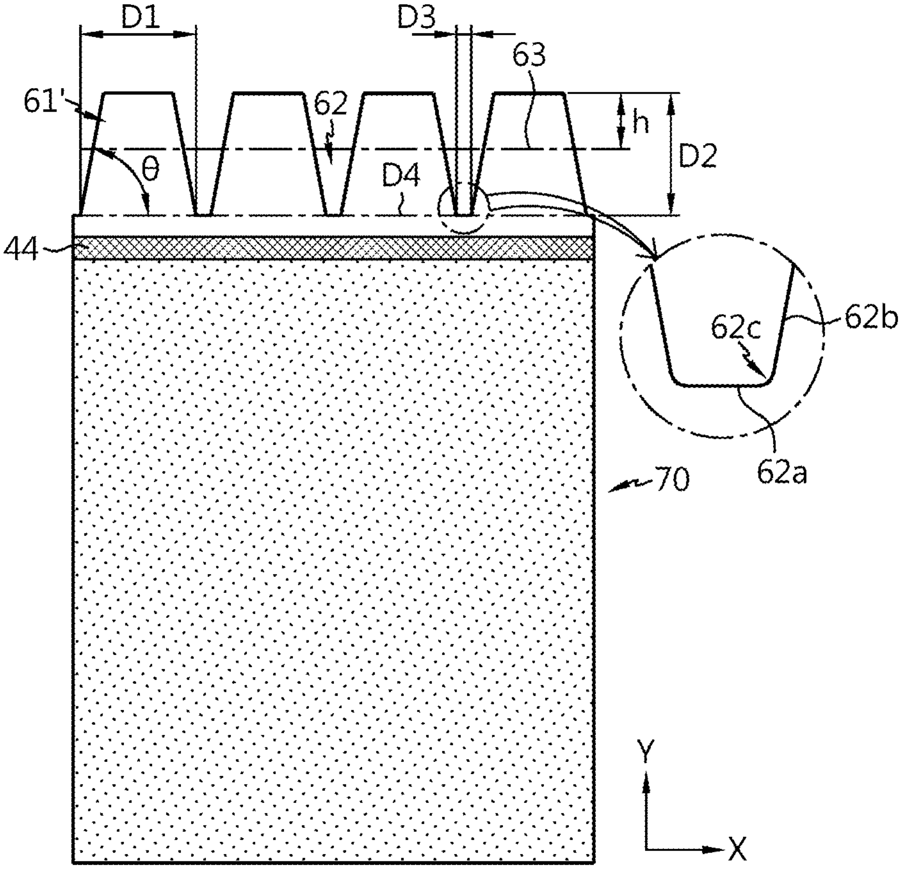
FIG. 11 is a diagram showing the definition of the segment width, height, and spacing pitch in the electrode plate of FIG. 10.

FIG. 11 is a diagram showing the definition of the width, height, and spacing pitch of the trapezoidal segment 61'.

Referring to FIG. 11, the descriptions of the width C1, the height C2, and the spacing pitch C3 of the segment 61 described with reference to FIG. 8 may be applied to the width D1, the height D2, and the spacing pitch D3 of the segment 61'. Also, the width at the top of segment 61' may be 0.5 mm to 6 mm. The segment 61' is bent at or above the point D4 passing through the bottom of the cut groove 62.

In the plurality of segments 61', the lower inner angle θ of the trapezoid may increase from the core toward the outer circumference. As the radius of the electrode assembly increases, the curvature increases. If the lower inner angle θ of the segment 61' increases as the radius of the electrode assembly increases, the stress occurring in the radial and circumferential directions when the segment 61' is bent may be relieved. In addition, if the lower inner angle θ is increased, when the segment 61' is bent, the area overlapping with the inner segment 61' and the number of overlapping layers also increase, thereby ensuring uniform welding strength in the radial and circumferential directions and forming the curved surface to be flat.

In one example, if the electrode plate 70 is used to manufacture an electrode assembly of a cylindrical battery cell having a form factor of 46110, 48750, 48110, 48800, 46800, etc., when the radius of the electrode assembly increases from 4 mm to 22 mm, the inner angle of the segment 61' may be increased step by step in the region of 60 degrees to 85 degrees. When the uncoated portion 43 is deformed to have the segment 61' as described above as the elongation and tensile strength of the current collector 41 have a predetermined range, the present disclosure has the effect of ensuring very suitable processability, that is, notching processability. There is no breaking or cracking in the notched area.

The experimental results below show the results of measuring the camber length and notching processability according to the change in elongation and tensile strength of the aluminum current collector.

After coating the active material layer on the aluminum current collector, the uncoated portion of the aluminum current collector may be notched along the longitudinal direction of the uncoated portion as described with reference to FIGS. 7 and 10 to be divided into a plurality of segments. The notching processability may be determined by breaking (cracking) that may occur in the notched area. If breaking occurs, it is indicated as Fail in Table 1, and if no breaking occurs, it is indicated as Pass.

For the elongation, after mounting the current collector sample in the sample grip part of the universal testing device (e.g., Instron 3345, 3365 UTM), the tensile strain is measured while pulling it at a constant speed, and the tensile strain when the sample is ruptured may be measured as elongation. The tensile strength may also be measured according to the measurement method of IPC-TM-650 using this universal testing device. In addition, the elongation may be obtained from the amount of deformation when the sample ruptures in the tensile strength test based on IPC-TM-650 at room temperature. Specifications for the tensile strength test in IPC-TM-650 are in 2.4.18, 2.4.19, etc. For example, it may be measured by the IPC-TM-650 (2.4.19) method.

Specifically, the current collector sample size is 12.7 mm in width and 150 mm in length, and the measurement speed is 20 mm/min. Since it is a method of measuring so that elongation occurs in the center portion of the sample, the gage distance of 50 mm is marked on the center portion of the sample (for example, a line with a length of 50 mm is marked on the center portion of the sample in parallel with the longitudinal direction of the sample), and the used equipment is UTM. After mounting the prepared current collector sample in the UTM, the test is performed at a reference speed (20 mm/min), and the tensile strength value is obtained by dividing the magnitude of the force when the center portion of the sample ruptures by the cross-sectional area of the specimen (specimen width X specimen thickness). Then, the ruptured samples are arranged in the longitudinal direction, and the elongation is calculated using Equation 1 through the degree of elongation from the gage distance of 50 mm marked at the beginning.

TABLE 1

| | uncoated portion length (mm) | elongation (%) | tensile strength (kgf/mm$^2$) | camber length (mm) | notching processability |
|---|---|---|---|---|---|
| Comparative Example 1 | 15 | 4.0 | 24.5 | 32 | Fail |
| Comparative Example 2 | 15 | 2.9 | 24.9 | 19 | Fail |
| Comparative Example 3 | 15 | 3.8 | 29.5 | 25 | Fail |
| Comparative Example 4 | 22 | 3.3 | 30.2 | 29 | Fail |
| Example 1 | 15 | 2.6 | 30.2 | 16 | Pass |
| Example 2 | 3 | 2.6 | 30.3 | 11 | Pass |

Referring to the experimental results, when the electrode plate is manufactured using an aluminum current collector with elongation exceeding 3.0% (Comparative Examples 1, 3 and 4), the camber length is measured to be about 20 mm or more. On the other hand, when the electrode plate is manufactured using an aluminum current collector whose elongation is in the range of 1.5 to 3.0% (Examples 1 and 2), the camber length is measured to be 16 mm and 11 mm, respectively. When the measured camber length exceeds 20 mm, a meandering defect occurs and breaking occurs. On the other hand, in Comparative Example 2, although the elongation does not exceed 3.0%, breaking occurs in the notched area, so the notching processability is not good. This is because the tensile strength is less than 25 kgf/mm$^2$. In the case of Examples 1 and 2, such problems do not occur. As such, according to the present disclosure, through the design of the elongation and tensile strength of the current collector, not only camber generation may be minimized, but also the occurrence of breaking when the segment is notched may be minimized.

Figure 12:
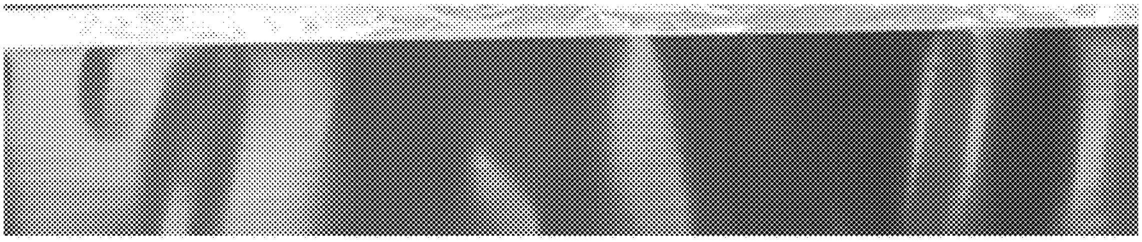
FIG. 12 is a photograph of comparatively showing the occurrence of the camber phenomenon when an electrode plate is manufactured using a current collector with optimized elongation and tensile strength according to an embodiment of the present disclosure and when an electrode plate is manufactured using a current collector according to the prior art.
Figure 12:
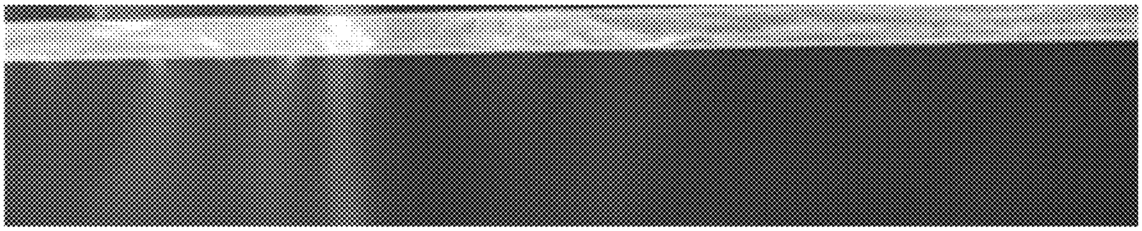

FIG. 12 is a photograph for comparing the degree of swell when the electrode plate is manufactured using the current collector of Comparative Example 3 and the current collector of Example 1. The photograph shown in (a) is an electrode plate (positive electrode plate) manufactured using the current collector of Comparative Example 3, and the photograph shown in (b) is an electrode plate (positive electrode plate) manufactured using the current collector of Example 1.

Referring to FIG. 12, it can be observed with the eyes that less swell occurs in the electrode plate manufactured using the current collector of Example 1.

The structures of the electrode plates 40, 60, 70 of the above-described embodiments (modifications) may be applied to at least one of a first electrode plate and a second electrode plate having different polarities included in a jelly-roll type electrode assembly. In addition, when the electrode structure of the embodiments (modifications) is applied to any one of the first electrode plate and the second electrode plate, a conventional electrode plate structure may be applied to the other one. In addition, the electrode plate structures applied to the first electrode plate and the second electrode plate may not be identical to each other and may be different.

For example, when the first electrode plate and the second electrode plate are a positive electrode plate and a negative electrode plate, respectively, any one of the embodiments (modifications) may be applied to the first electrode plate and the conventional electrode plate structure (see FIG. 1) may be applied to the second electrode plate.

As another example, when the first electrode plate and the second electrode plate are a positive electrode plate and a negative electrode plate, respectively, any one of the embodiments (modifications) may be selectively applied to the first electrode plate and any one of the embodiments (modifications) may be selectively applied to the second electrode plate.

In the present disclosure, the positive electrode active material and the negative electrode active material coated on a current collector may be any type of active material, provided that the active material is well known in the art.

In an example, the positive electrode active material may include an alkali metal compound expressed by a general chemical formula $A[A_xM_y]O_{2+z}$ (A includes at least one of Li, Na, and K; M includes at least one element selected from Ni, Co, Mn, Ca, Mg, Al, Ti, Si, Fe, Mo, V, Zr, Zn, Cu, Al, Mo, Sc, Zr, Ru, and Cr; x≥0, 1≤x+y≤2, −0.1≤z≤2; and stoichiometric coefficients x, y, and z are selected so that the compound maintains electrically neutral).

Preferably, the positive electrode active material contains lithium transition metal oxide. The lithium transition metal may contain nickel-cobalt-manganese-based lithium oxides, among which a high-concentration nickel-cobalt-manganese-based lithium oxide having a high nickel content may be included.

In another embodiment, the positive electrode active material may be an alkali metal compound $xLiM^1O_{2-(1-x)}Li_2M^2O_3$ ($M^1$ includes at least one element having an average oxide state of 3; $M^2$ includes at least one element having an average oxidation state of 4; and 0≤x≤1) disclosed in U.S. Pat. Nos. 6,677,082, 6,680,143, etc.

In another example, the positive electrode active material may be lithium metal phosphate expressed by a general chemical formula $Li_aM_x^1Fe_{1-x}M_y^2P_{1-y}M_z^3O_{4-z}$ ($M^1$ includes at least one element selected from Ti, Si, Mn, Co, Fe, V, Cr, Mo, Ni, Nd, Al, Mg, and Al; $M^2$ includes at least one element selected from Ti, Si, Mn, Co, Fe, V, Cr, Mo, Ni, Nd, Al, Mg, Al, As, Sb, Si, Ge, V, and S; $M^3$ includes an element of a halogen group optionally containing F; 0<a≤2, 0≤x≤1, 0≤y≤1, 0≤z<1; and stoichiometric coefficients a, x, y, and z are selected so that the compound maintains electrically neutral), or $Li_3M_2(PO_4)_3$ (M includes at least one element selected from Ti, Si, Mn, Fe, Co, V, Cr, Mo, Ni, Al, Mg, and Al).

Preferably, the positive electrode active material may include primary particles and/or secondary particles in which the primary particles are aggregated.

In an example, the negative electrode active material may use a carbon material, lithium metal or lithium metal compounds, silicon or silicon compounds, tin or tin compounds, etc. Metal oxide such as $TiO_2$ or $SnO_2$ having a potential of less than 2 V may be also used as the negative electrode active material. As the carbon material, low crystalline carbon and high crystalline carbon may be used.

The separator may include a porous polymer film, for example, made of a polyolefin-based polymer such as an ethylene homopolymer, a propylene homopolymer, an ethylene/butene copolymer, an ethylene/hexene copolymer, or an ethylene/methacrylate copolymer, in a single or stack structure thereof. In another example, the separator may be a common porous non-woven fabric, for example, a non-woven fabric made of glass fiber having a high melt point or polyethylene terephthalate fiber.

At least one surface of the separator may include a coating layer of inorganic particles. Alternatively, the separator itself may be made of a coating layer of inorganic particles. The particles included in the coating layer may be coupled with a binder so that an interstitial volume exists between adjacent particles.

The inorganic particles may include an inorganic material having a dielectric constant of 5 or more. In a non-limiting example, the inorganic particles may include at least one material selected from the group consisting of $Pb(Zr,Ti)O_3$ (PZT), $Pb_{1-x}La_xZr_{1-y}Ti_yO_3$(PLZT), $Pb(Mg_{1/3}Nb_{2/3})O_3$-Pb-$TiO_3$(PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, and $Y_2O_3$.

Figure 13:
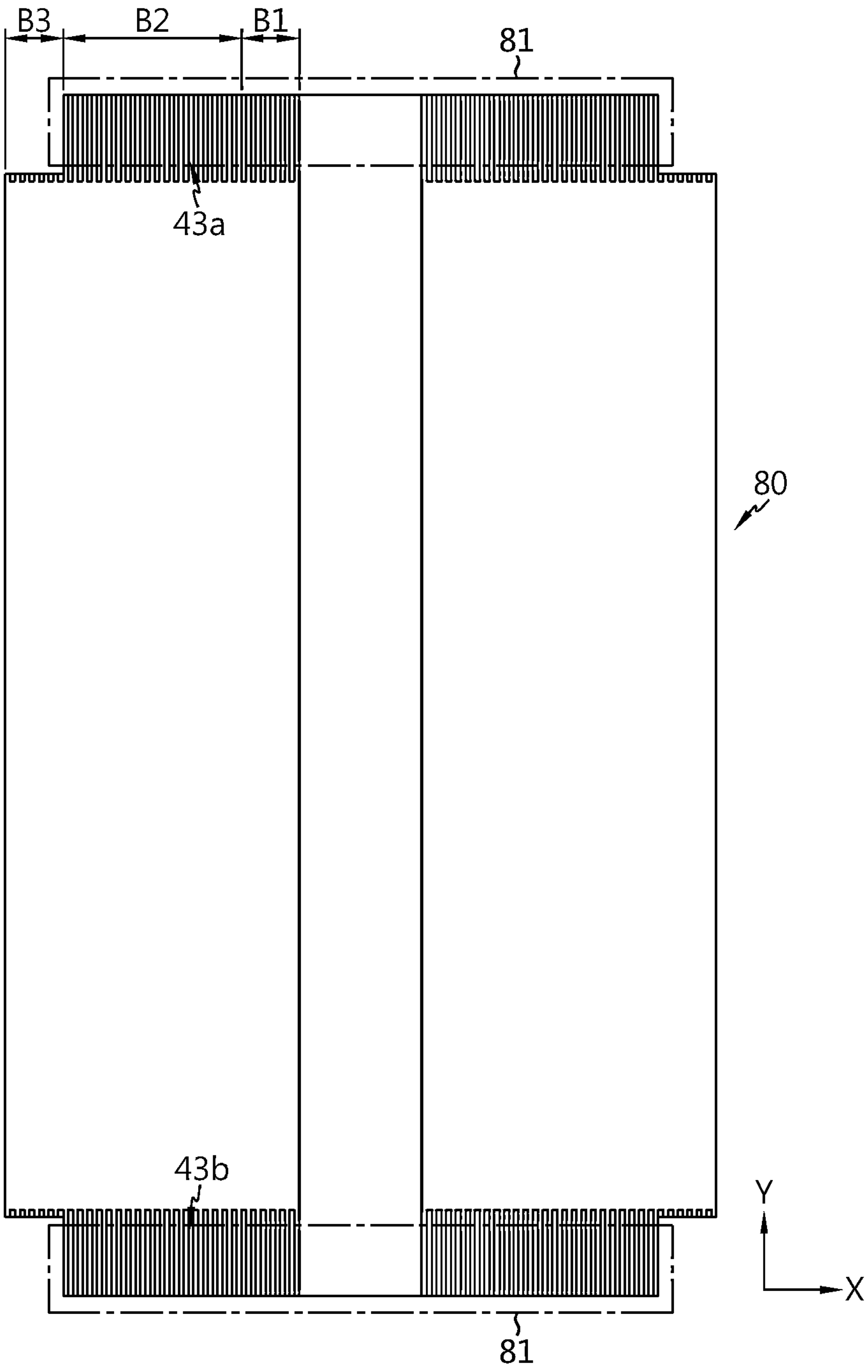
FIG. 13 is a cross-sectional view of a jelly-roll type electrode assembly in which the electrode plate of the first embodiment is applied to the first electrode plate (positive electrode plate) and the second electrode plate (negative electrode plate), taken along the Y-axis direction (winding axis direction).

FIG. 13 is a cross-sectional view of an electrode assembly according to an embodiment of the present disclosure. FIG. 13 is a cross-sectional view of a jelly-roll type electrode assembly in which the electrode plate 50 of the first embodiment shown in FIG. 6 is applied to the first electrode plate (positive electrode plate) and the second electrode plate (negative electrode plate), taken along the Y-axis direction (winding axis direction).

Figure 2:
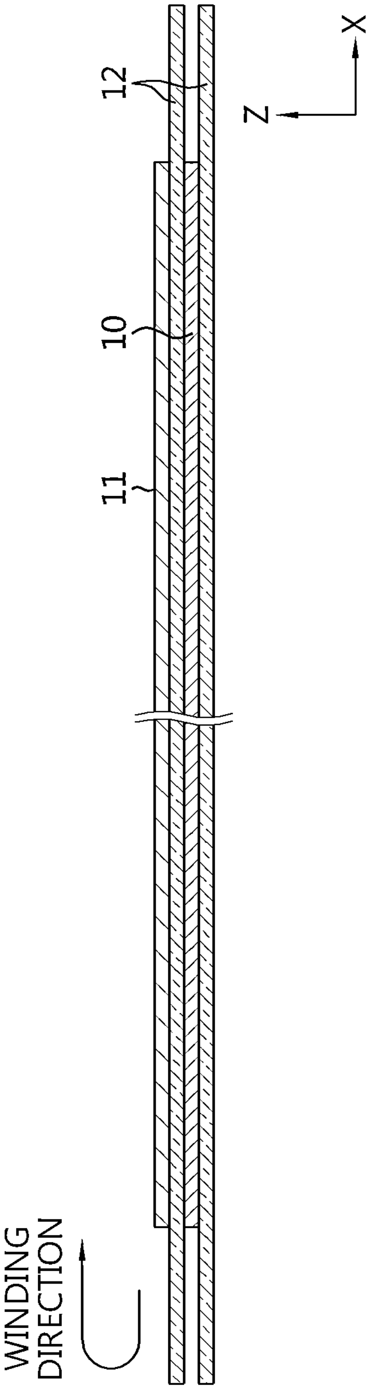
FIG. 2 is a view showing an electrode plate winding process for manufacturing a jelly-roll type electrode assembly.
Figure 3:
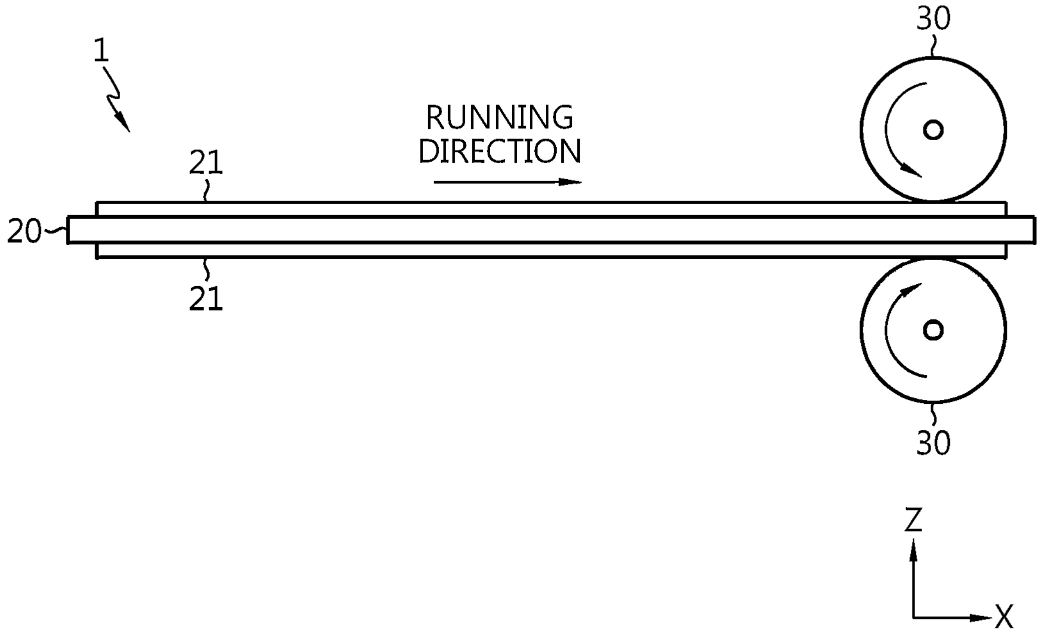
FIG. 3 is a schematic diagram explaining the process of rolling the electrode plate using a roller.
Figure 4:
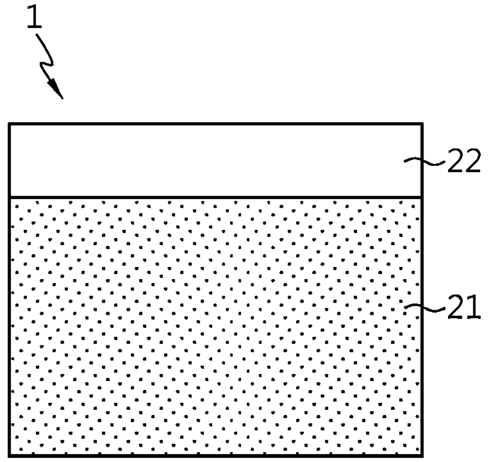
FIG. 4 is a view for explaining a phenomenon in which a swell occurs along the longitudinal direction of the electrode plate when the active material layer coated on the current collector is compressed according to the prior art.
Figure 4:
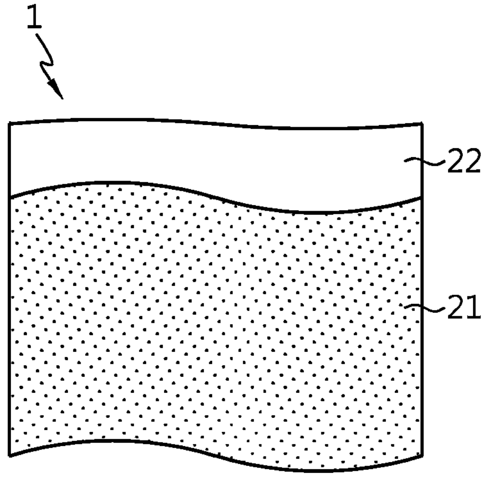
Figure 5:
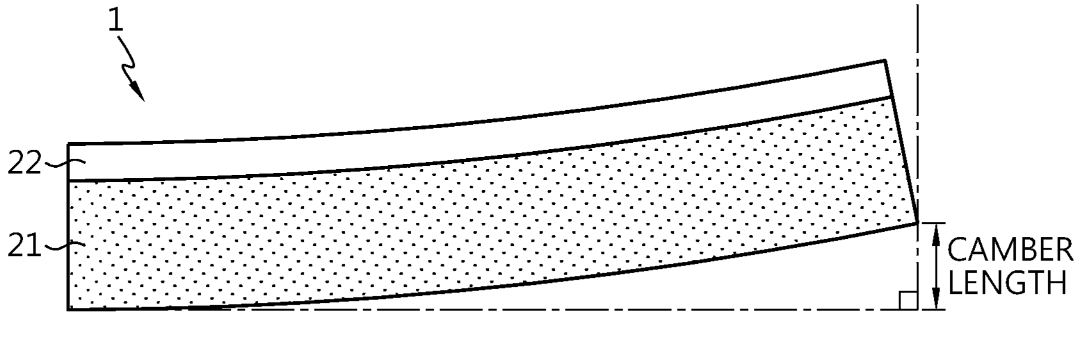
FIG. 5 is a diagram for explaining the camber phenomenon in which the electrode plate is bent toward the uncoated portion when the swelled electrode plate is spread out in a straight line.

The electrode assembly 80 may be manufactured by the winding method described with reference to FIG. 2. It has a structure in which the first and second electrode plates having a sheet shape and a separator interposed therebetween are wound in one direction. For convenience of description, the protrusion structures of the uncoated portions 43*a*, 43*b* extending to the outside of the separator are illustrated in detail, and the illustration of the winding structure of the first electrode plate, the second electrode plate, and the separator is omitted. The uncoated portion 43*a* protruding upwards extends from the first electrode plate, and the uncoated portion 43*b* protruding downwards extends from the second electrode plate. At least a part of the upper uncoated portion 43*a* and the lower uncoated portion 43*b* is exposed to the outside of the separator and is used as an electrode tab by itself.

Referring to FIG. 13, the uncoated portion 43*a* of the first electrode plate includes a core-side uncoated portion B1 adjacent to the core of the electrode assembly 80, an outer circumference uncoated portion B3 adjacent to the outer circumferential surface of the electrode assembly 80, and an intermediate uncoated portion B2 interposed between the core-side uncoated portion B1 and the outer circumference uncoated portion B3.

The height of the outer circumference uncoated portion B3 (the length in the Y-axis direction) is relatively smaller than the height of the intermediate uncoated portion B2. Accordingly, it is possible to prevent the occurrence of an internal short circuit as the outer circumference uncoated portion B3 is compressed on the beading portion of the battery can. As described above, according to the present disclosure, an internal short circuit inside the cylindrical battery cell caused by the partial deformation of the electrode assembly 80 may be prevented by improving the structure of the uncoated portions 43*a*, 43*b* so that the electrode assembly 80 and the inner circumferential surface of the battery can do not interfere during the formation of the beading portion of the battery can.

The lower uncoated portion 43*b* has the same structure as the upper uncoated portion 43*a*. In one modification, the lower uncoated portion 43*b* may have a conventional electrode plate structure or an electrode plate structure of other embodiments (modifications).

The ends 81 of the upper uncoated portion 43*a* and the lower uncoated portion 43*b* may be bent in a radial direction of the electrode assembly 80, for example, from the outer circumference toward the core. At this time, the outer circumference uncoated portion B3 may not be substantially bent.

Figure 14:
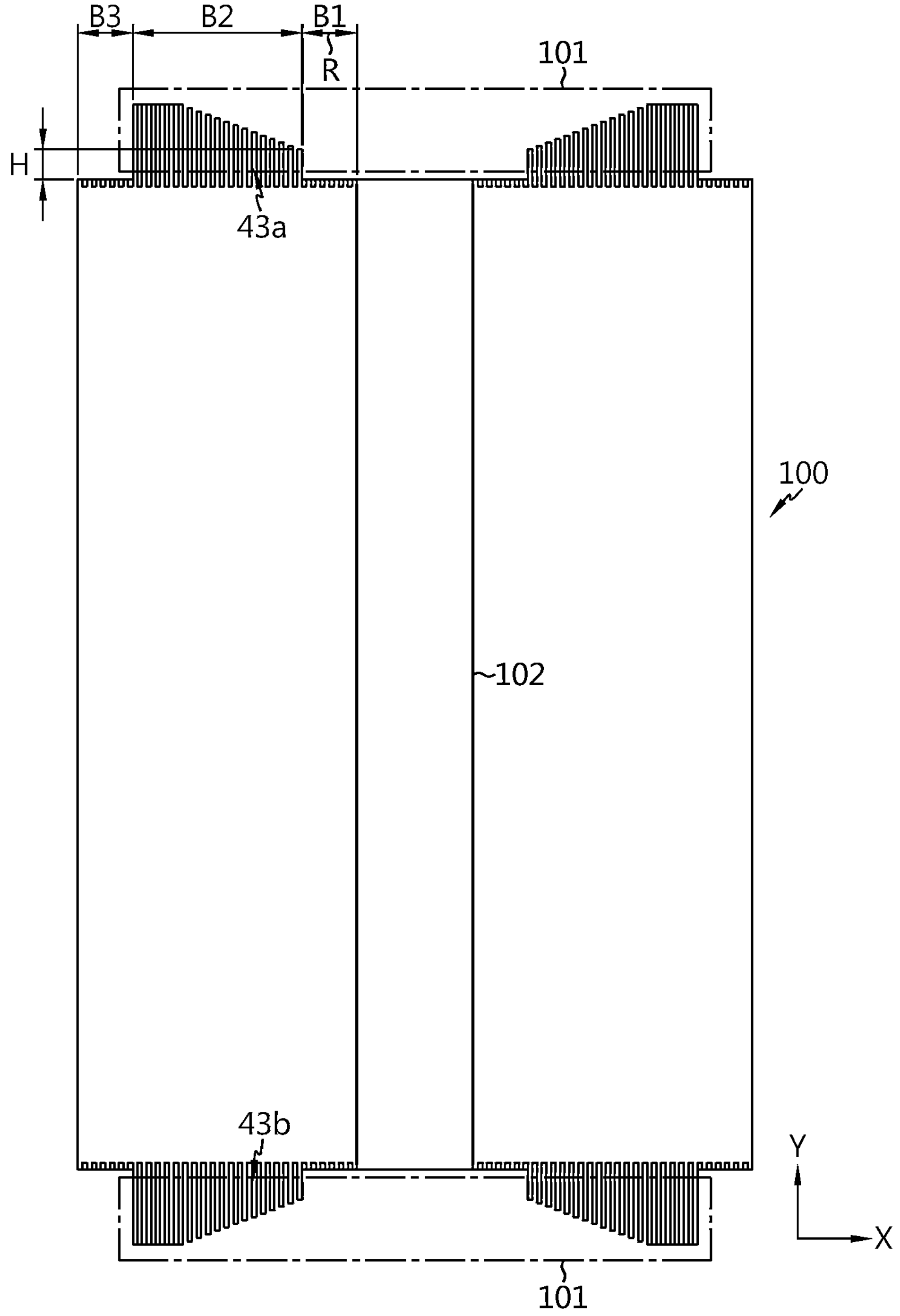
FIG. 14 is a cross-sectional view of a jelly-roll type electrode assembly in which any one of the electrode plates of the second and third embodiments (modifications thereof) is applied to the first electrode plate (positive electrode plate) and the second electrode plate (negative electrode plate), taken along the Y-axis direction (winding axis direction).

FIG. 14 is a cross-sectional view of a jelly-roll type electrode assembly 100 in which any one of the electrode plates 60, 70 of the second and third embodiments is applied to the first electrode plate (positive electrode plate) and the second electrode plate (negative electrode plate), taken along the Y-axis direction (winding axis direction).

Referring to FIG. 14, the uncoated portion 43*a* of the first electrode plate includes a core-side uncoated portion B1 adjacent to the core of the electrode assembly 100, an outer circumference uncoated portion B3 adjacent to the outer circumferential surface of the electrode assembly 100, and an intermediate uncoated portion B2 interposed between the core-side uncoated portion B1 and the outer circumference uncoated portion B3.

The patterns in which the heights of the uncoated portions 43*a*, 43*b* change are schematically illustrated. That is, the heights of the uncoated portions 43*a*, 43*b* may change irregularly depending on the position at which the cross-section is cut. For example, when the side portions of the trapezoidal segments 61, 61' are cut, the height of the uncoated portion in the cross section is lower than the height of the segments 61, 61'. Accordingly, it should be understood that the heights of the uncoated portions 43*a*, 43*b* shown in the drawings illustrating the cross-section of the electrode assembly correspond to the average of the heights of the uncoated portions (C2 in FIGS. 8 and D2 in FIG. 11) included in each winding turn.

The height of the core-side uncoated portion B1 is relatively smaller than the height of the intermediate uncoated portion B2. In addition, in the intermediate uncoated portion B2, the bending length of the innermost uncoated portion 43*a* is equal to or smaller than the radial length R of the core-side uncoated portion B1. The bending length H corresponds to the height of the uncoated portion 43*a* based on the point (h in FIG. 8 and h in FIG. 11) at which the uncoated portion 43*a* is bent. D4 is the lowest point of the bending point, and the bending point may be set above D4.

Therefore, even if the intermediate uncoated portion B2 is bent, the bent portion does not block the cavity 102 of the core of the electrode assembly 100. If the cavity 102 is not blocked, there is no difficulty in the electrolyte injection process, and the electrolyte solution injection efficiency is improved. In addition, by inserting a welding jig through the cavity 102, the welding process between the current collector plate of the negative electrode and the battery can may be easily performed.

The height of the outer circumference uncoated portion B3 is relatively smaller than the height of the intermediate uncoated portion B2. Accordingly, it is possible to prevent the occurrence of an internal short circuit as the outer circumference uncoated portion B3 is compressed on the beading portion of the battery can.

In one modification, the height of the outer circumference uncoated portion B3 may be decreased gradually or stepwise, unlike that shown in FIG. 14. In addition, in FIG. 14, the height of the intermediate uncoated portion B2 is the same as a part of the outer circumference, but the height of the intermediate uncoated portion B2 may increase gradually or stepwise from the boundary between the core-side uncoated portion B1 and the intermediate uncoated portion B2 to the boundary between the intermediate uncoated portion B2 and the outer circumference uncoated portion B3.

The lower uncoated portion 43*b* has the same structure as the upper uncoated portion 43*a*. In one modification, the lower uncoated portion 43*b* may have a conventional electrode plate structure or an electrode plate structure of other embodiments (modifications).

The ends 101 of the upper uncoated portion 43*a* and the lower uncoated portion 43*b* may be bent in a radial direction of the electrode assembly 100, for example, from the outer circumference toward the core. At this time, the core-side uncoated portion B1 and the outer circumference uncoated portion B3 are not substantially bent.

When the intermediate uncoated portion B2 includes a plurality of segments, the bending stress is relieved to prevent the uncoated portion 43*a* near the bending point from being torn or abnormally deformed. In addition, when the width and/or height and/or spacing pitch of the segments is adjusted according to the numerical range of the above-described embodiment, the segments are overlapped in a plurality of layers to sufficiently secure the welding strength while bending toward the core, and an empty space (gap) is not formed in the bending surface (the surface as viewed from the Y-axis). In addition, since the elongation and tensile strength of the current collector 41 are optimized, there is no breaking or cracking between the plurality of segments.

Figure 15:
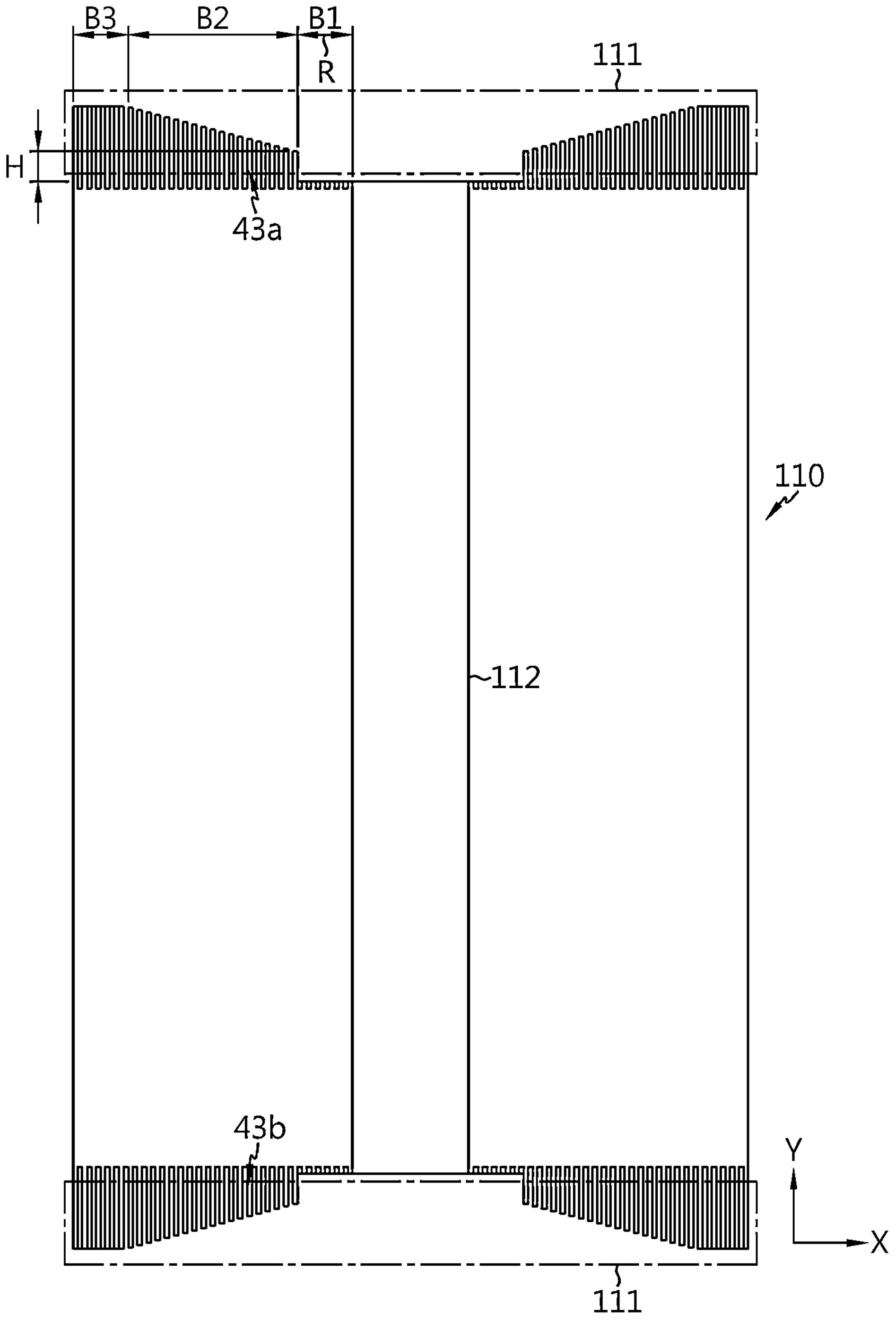
FIG. 15 is a cross-sectional view taken along the Y-axis direction (winding axis direction) of the electrode assembly according to another embodiment of the present disclosure.

FIG. 15 is a cross-sectional view of the electrode assembly 110 according to another embodiment of the present disclosure, taken along the Y-axis direction (winding axis direction).

The electrode assembly 110 of FIG. 15 has substantially the same configuration as the electrode assembly 100 of FIG. 14, except that the height of the outer circumference uncoated portion B3 is substantially the same as the height of the outermost side of the intermediate uncoated portion B2.

The outer circumference uncoated portion B3 may include a plurality of segments. For the configuration related to the plurality of segments, the descriptions of the preceding embodiments (modifications) are applied substantially in the same way.

In the electrode assembly 110, the height of the core-side uncoated portion B1 is relatively smaller than the height of the intermediate uncoated portion B2. In addition, in the intermediate uncoated portion B2, the bending length H of the innermost uncoated portion is equal to or smaller than the radial length R of the core-side uncoated portion B1.

Therefore, even if the intermediate uncoated portion B2 is bent, the bent portion does not block the cavity 112 of the core of the electrode assembly 110. If the cavity 112 is not blocked, there is no difficulty in the electrolyte injection process, and the electrolyte solution injection efficiency is improved. In addition, by inserting a welding jig through the cavity 112, the welding process between the current collector plate of the negative electrode and the battery can may be easily performed.

In one modification, the structure in which the height of the intermediate uncoated portion B2 increases gradually or stepwise from the core toward the outer circumference may be extended to the outer circumference uncoated portion B3. In this case, the height of the uncoated portion 43*a* may be increased gradually or stepwise from the boundary between the core-side uncoated portion B1 and the intermediate uncoated portion B2 to the outermost surface of the electrode assembly 110.

The lower uncoated portion 43*b* has the same structure as the upper uncoated portion 43*a*. In one modification, the lower uncoated portion 43*b* may have a conventional electrode plate structure or an electrode plate structure of other embodiments (modifications).

The ends 111 of the upper uncoated portion 43*a* and the lower uncoated portion 43*b* may be bent from the outer circumference of the electrode assembly 110 toward the core. At this time, the core-side uncoated portion B1 is not substantially bent.

When the intermediate uncoated portion B2 and the outer circumference uncoated portion B3 include a plurality of segments, the bending stress is relieved to prevent the uncoated portions 43*a*, 43*b* near the bending point from being torn or abnormally deformed. In addition, when the width and/or height and/or spacing pitch of the segments is adjusted according to the numerical range of the above-described embodiment, the segments are overlapped in a plurality of layers to sufficiently secure the welding strength while being bent toward the core, and an empty space (gap) is not formed in the bending surface (the surface as viewed from the Y-axis). In addition, since the elongation and tensile strength of the current collector 41 are optimized, there is no breaking or cracking between the plurality of segments.

Various electrode assembly structures according to an embodiment of the present disclosure may be applied to a jelly-roll type cylindrical battery cell.

Preferably, the cylindrical battery cell may be a cylindrical battery cell having, for example, a form factor ratio (defined as a value obtained by dividing a diameter of a cylindrical battery cell by a height, that is, a height (H)-to-diameter (Φ) ratio) greater than about 0.4.

When an electrode assembly having a tab-less structure is applied to a cylindrical battery cell having a form factor ratio of more than 0.4, the stress applied in the radial direction when the uncoated portion is bent is large, so that the uncoated portion may be easily torn. In addition, when welding the current collector plate to the bent surface of the uncoated portion, the number of overlapping layers of the uncoated portion should be sufficiently increased in order to sufficiently secure the welding strength and lower the resistance. This requirement can be achieved by the electrode plate and the electrode assembly according to the embodiments (modifications) of the present disclosures.

A battery cell according to an embodiment of the present disclosure may be a cylindrical battery cell having an approximately cylindrical shape, with a diameter of about 46 mm, a height of about 110 mm, and a form factor ratio of 0.418.

A battery cell according to another embodiment may be a cylindrical battery cell having an approximately cylindrical shape, with a diameter of about 48 mm, a height of about 75 mm, and a form factor ratio of 0.640.

A battery cell according to another embodiment may be a cylindrical battery cell having an approximately cylindrical shape, with a diameter of about 48 mm, a height of about 110 mm, and a form factor ratio of 0.418.

A battery cell according to another embodiment may be a cylindrical battery cell having an approximately cylindrical shape, with a diameter of about 48 mm, a height of about 80 mm, and a form factor ratio of 0.600.

A battery cell according to another embodiment may be a cylindrical battery cell having an approximately cylindrical shape, with a diameter of about 46 mm, a height of about 80 mm, and a form factor ratio of 0.575.

Conventionally, battery cells having a form factor ratio of about 0.4 or less have been used. That is, conventionally, for example, 18650 cells, 21700 cells, and the like have been used. The 18650 cell has a diameter of approximately 18 mm, a height of approximately 65 mm, and a form factor ratio of 0.277. The 21700 cell has a diameter of approximately 21 mm, a height of approximately 70 mm, and a form factor ratio of 0.300.

Hereinafter, a cylindrical battery cell according to an embodiment of the present disclosure will be described in detail.

Figure 16:
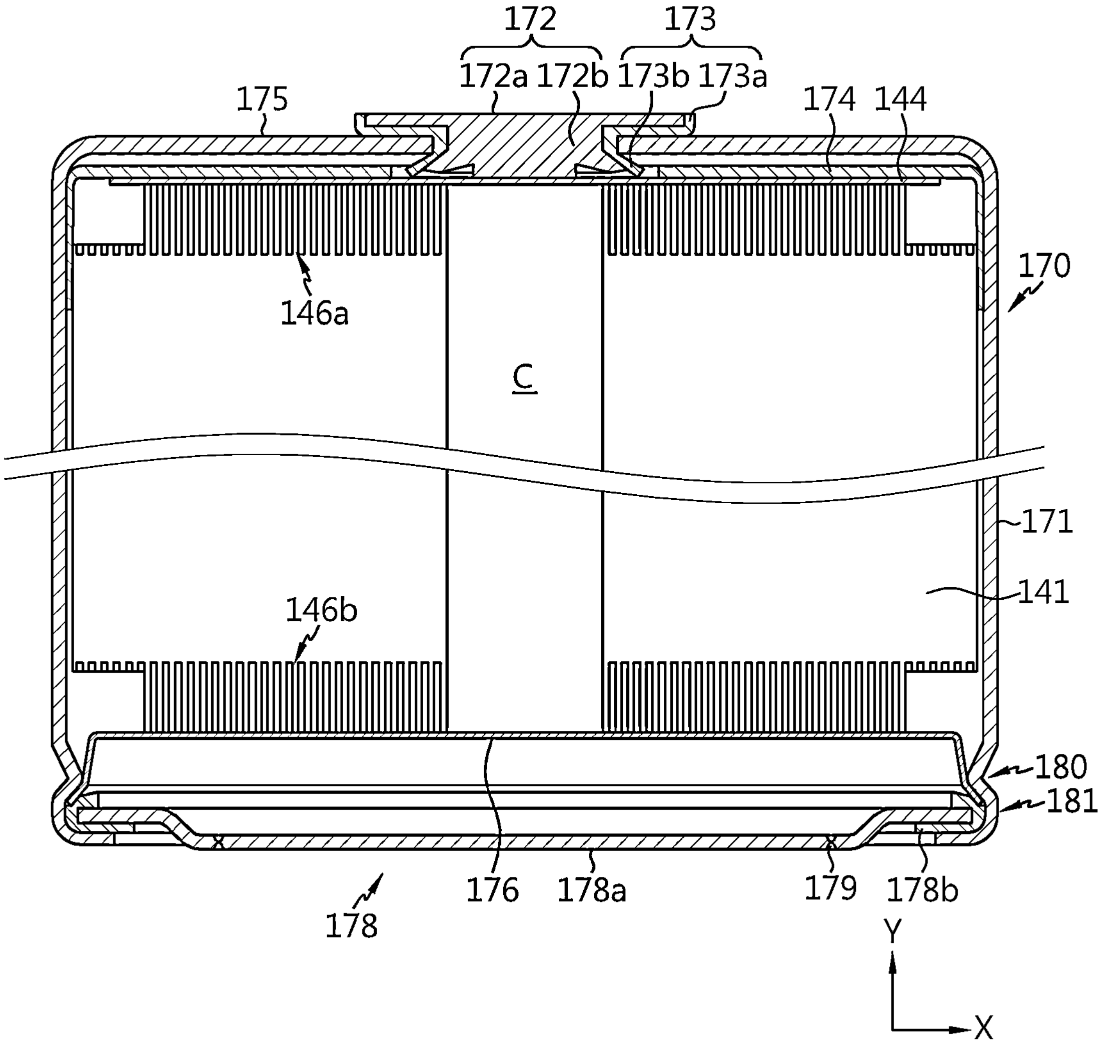
FIG. 16 is a cross-sectional view of the cylindrical battery cell according to an embodiment of the present disclosure, taken along the Y-axis direction.

FIG. 16 is a cross-sectional view of the cylindrical battery cell 170 according to an embodiment of the present disclosure, taken along the Y-axis direction.

Referring to FIG. 16, a cylindrical battery cell 170 according to an embodiment of the present disclosure includes an electrode assembly 141 having a first electrode plate, a separator, and a second electrode plate. The cylindrical battery cell 170 includes a battery can 171 through which a rivet terminal 172 is installed. The battery can 171 is made of a metal material with conductivity such as aluminum or steel. The battery can 171 accommodates the electrode assembly 141 in the inner space and also accommodates the electrolyte together.

The electrolyte may be a salt having a structure such as $A^+B^-$. Here, $A^+$ includes an alkali metal cation such as $Li^+$, $Na^+$, or $K^+$ or a combination thereof. In addition, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The electrolyte may also be dissolved in an organic solvent. The organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The electrode assembly 141 may have a jelly-roll shape. The electrode assembly 141 may be manufactured by winding a stack, which is formed by sequentially stacking the lower separator, the first electrode plate, the upper separator, and the second electrode plate at least once, based on the winding center C, as shown in FIG. 2.

The first electrode plate and the second electrode plate have different polarities. That is, if one has positive polarity, the other has negative polarity. At least one of the first electrode plate and the second electrode plate may have an electrode plate structure according to the above-described embodiments (modifications). In addition, the other of the first electrode plate and the second electrode plate may have a conventional electrode plate structure or an electrode plate structure according to the embodiments (modifications).

For example, the first polarity is negative polarity, and the second polarity is positive polarity. The battery can 171 is electrically connected to one of the first electrode plate and the second electrode plate to have the first polarity. The first polarity is the negative polarity, and the battery can 171 is connected to the electrode plate having the negative polarity. For example, the battery can 171 is connected to the second electrode plate.

The uncoated portion 146*a* of the first electrode plate and the uncoated portion 146*b* of the second electrode plate protrude from the upper and lower portions of the electrode assembly 141, respectively. The rivet terminal 172 is installed on the closed surface (top surface in the drawing) of the battery can 171. The rivet terminal 172 is riveted to the through hole of the battery can 171 with the second gasket 173 having insulation interposed therebetween. The rivet terminal 172 is exposed to the outside in the direction opposite to the direction of gravity. The surface of the rivet terminal 172 is exposed to the outside.

The rivet terminal 172 includes a terminal exposing portion 172*a* and a terminal insert portion 172*b*. The terminal exposing portion 172*a* is exposed to the outside of the closed surface of the battery can 171. The terminal exposing portion 172*a* may be located approximately at the center of the closed surface of the battery can 171. The maximum diameter of the terminal exposing portion 172*a* may be larger than the maximum diameter of the through hole formed in the battery can 171. The terminal insert portion 172*b* may be electrically connected to the uncoated portion 146*a* of the first electrode plate through approximately the central portion of the closed surface of the battery can 171. The terminal insert portion 172*b* may be riveted to the inner surface of the battery can 171. That is, the end of the terminal insert portion 172*b* may have a shape curved toward the inner surface of the battery can 171. The maximum diameter of the end of the terminal insert portion 172*b* may be larger than the maximum diameter of the through hole of the battery can 171. The rivet terminal 172 is electrically connected to the other one of the first electrode plate and the second electrode plate that is not connected to the battery can 171. For example, the rivet terminal 172 is connected to the first electrode plate with positive polarity, and thus has positive polarity that is the second polarity.

The cylindrical battery cell 170 may further include a first current collector plate 144. The first current collector plate 144 is made of a conductive metal material such as aluminum, copper, nickel, etc., and is electrically connected to the uncoated portion 146*a* of the first electrode plate. The first current collector plate 144 may include a plurality of irregularities (not shown) radially formed on the lower surface thereof. When the radial irregularities are provided, the irregularities may be press fit to the uncoated portion 146*a* of the first electrode plate by pressing the first current collector plate 144.

The first current collector plate 144 is coupled to the end of the uncoated portion 146*a* of the first electrode plate. The coupling between the uncoated portion 146*a* and the first current collector plate 144 may be made, for example, by laser welding. The laser welding may be performed in a manner that partially melts the current collector plate base material. In a modification, the welding between the first current collector plate 144 and the uncoated portion 146*a* may be performed with solder interposed therebetween. In this case, the solder may have a lower melting point compared to the first current collector plate 144 and the uncoated portion 146*a*. The laser welding may be replaced by resistance welding, ultrasonic welding, or the like.

Preferably, the rivet terminal 172 electrically connected to the uncoated portion 146*a* of the first electrode plate is used as the first electrode terminal. If the first electrode plate has a positive polarity, the rivet terminal 172 connected thereto becomes a positive electrode terminal.

The bottom surface of the terminal insert portion 172*b* may be welded to the first current collector plate 144 connected to the uncoated portion 146*a* of the first electrode plate. An insulation cap 174 made of an insulating material may be interposed between the first current collector plate 144 and the inner surface of the battery can 171. The insulation cap 174 covers the upper portion of the first current collector plate 144 and the top edge of the electrode assembly 141. Accordingly, it is possible to prevent a short circuit caused by the contact of the outer circumference uncoated portion B3 of the electrode assembly 141 with the inner surface of the battery can 171 having a different polarity. The terminal insert portion 172*b* of the rivet terminal 172 may be welded to the first current collector plate 144 through the insulation cap 174.

The second gasket 173 is interposed between the battery can 171 and the rivet terminal 172 to prevent the battery can 171 and the rivet terminal 172 having opposite polarities from being electrically contacted to each other. Accordingly, the top surface of the battery can 171 having a substantially flat shape may function as the second electrode terminal of the cylindrical battery cell 170. For example, it may become the negative electrode terminal.

The second gasket 173 includes a gasket exposing portion 173*a* and a gasket insert portion 173*b*. The gasket exposing portion 173*a* is interposed between the terminal exposing portion 172*a* of the rivet terminal 172 and the battery can 171. The gasket insert portion 173*b* is interposed between the terminal insert portion 172*b* of the rivet terminal 172 and the battery can 171. When the terminal insert portion 172*b* is riveted, the gasket insert portion 173*b* may be deformed together to be in close contact with the inner surface of the battery can 171. The second gasket 173 may be made of, for example, a polymer resin having insulation.

The gasket exposing portion 173*a* of the second gasket 173 may have an extended shape to cover the outer circumferential surface of the terminal exposing portion 172*a* of the rivet terminal 172. When the second gasket 173 covers the outer circumferential surface of the rivet terminal 172, it is possible to prevent a short circuit from occurring in the process of connecting electrical connection parts such as bus bars to the top surface of the battery can 171 and/or to the rivet terminal 172. Although not shown in the drawings, the gasket exposing portion 173*a* may have an extended shape to cover not only the outer circumferential surface of the terminal exposing portion 172*a* but also a part of the top surface.

When the second gasket 173 is made of a polymer resin, the second gasket 173 may be coupled to the battery can 171 and the rivet terminal 172 by thermal fusion. In this case, airtightness at the coupling interface between the second gasket 173 and the rivet terminal 172 and at the coupling interface between the second gasket 173 and the battery can 171 may be enhanced. Meanwhile, in the case where the gasket exposing portion 173*a* of the second gasket 173 extends to the top surface of the terminal exposing portion 172*a*, the rivet terminal 172 may be integrally coupled with the second gasket 173 by insert injection.

In the top surface of the battery can 171, the remaining area 175 except for the area occupied by the rivet terminal 172 and the second gasket 173 corresponds to the second electrode terminal having a polarity opposite to that of the rivet terminal 172.

The second current collector plate 176 is coupled to the lower portion of the electrode assembly 141. The second current collector plate 176 is made of a conductive metal material such as aluminum, steel, copper, or nickel, and is electrically connected to the uncoated portion 146*b* of the second electrode plate.

Preferably, the second current collector plate 176 is electrically connected to the battery can 171. To this end, at least a part of the edge of the second current collector plate 176 may be interposed and fixed between the inner surface of the battery can 171 and the first gasket 178*b*. In one example, at least a part of the edge of the second current collector plate 176 may be fixed to the beading portion 180 by welding while being supported on the bottom surface of the beading portion 180 formed at the lower end of the battery can 171. The beading portion 180 is formed by beading the outer circumferential surface of the battery can 171. In a modification, at least a part of the edge of the second current collector plate 176 may be directly welded to the inner wall surface of the battery can 171.

The second current collector plate 176 may include a plurality of irregularities (not shown) radially formed on a surface opposite to the uncoated portion 146*b*. If the irregularities are formed, the irregularities may be press fit to the uncoated portion 146*b* by pressing the second current collector plate 176. Preferably, the second current collector plate 176 and the end of the uncoated portion 146*b* may be coupled by welding, for example, laser welding.

The uncoated portions 146*a*, 146*b* are not limited to the illustrated structures. Accordingly, the uncoated portions 146*a*, 146*b* may selectively have the uncoated portion structure of the electrode plate according to the embodiments (modifications) as well as the conventional uncoated portion structure.

The sealing body 178 that seals the lower open end of the battery can 171 includes a cap plate 178*a* and a first gasket 178*b*. The first gasket 178*b* electrically separates the cap plate 178*a* from the battery can 171. The crimping portion 181 fixes the edge of the cap plate 178*a* and the first gasket 178*b* together.

The cap plate 178*a* is provided with a vent portion 179. The vent portion 179 corresponds to a region of the cap plate 178*a* having a thinner thickness compared to the surrounding region. The vent portion 179 is structurally weak compared to the surrounding region. Accordingly, when an abnormality occurs in the cylindrical battery cell 170 and the internal pressure increases to a certain level or more, the vent portion 179 may be ruptured and the gas generated inside the battery can 171 may be discharged to the outside. The vent portion 179 may be formed continuously or discontinuously while drawing a circle on the cap plate 178*a*. In a modification, the vent portion 179 may be formed in a straight pattern or other patterns.

Preferably, the cap plate 178*a* is made of a conductive metal material. However, since the first gasket 178*b* is interposed between the cap plate 178*a* and the battery can 171, the cap plate 178*a* does not have electrical polarity. The cap plate 178*a* seals the open end of the lower portion of the battery can 171 and discharges gas when the internal pressure of the battery cell 170 increases to a critical value or more.

In the upper surface of the battery can 171 electrically connected to the uncoated portion 146*b* of the second electrode plate through the second current collector plate 176, the remaining area 175 except for the rivet terminal 172 is used as the second electrode terminal having a different polarity from the first electrode terminal. When the two electrode terminals, the first electrode terminal and the second electrode terminal, are located on the upper portion of the cylindrical battery cell 170 as above, it is possible to arrange an electrical connection component such as a bus bar on only one side of the cylindrical battery cell 170. This may bring about simplification of the battery pack structure and improvement of energy density. In addition, since the region 175 used as the second electrode terminal has an approximately flat shape, a sufficient bonding area may be secured for bonding electrical connection components such as bus bars. Accordingly, the cylindrical battery cell 170 may lower the resistance at the bonding portion of the electrical connection component to a desirable level.

The cylindrical battery cell 170 may lower the internal resistance of the battery cell and increase the energy density by using the uncoated portions 146*a*, 146*b* protruding from the upper and lower portions of the electrode assembly 141 as electrode tabs.

Meanwhile, the structure of the electrode assembly 141 and the structure of the uncoated portion are not limited to the illustrated ones, and may be substituted with the structures of the above-described embodiments (modifications).

Figure 17:
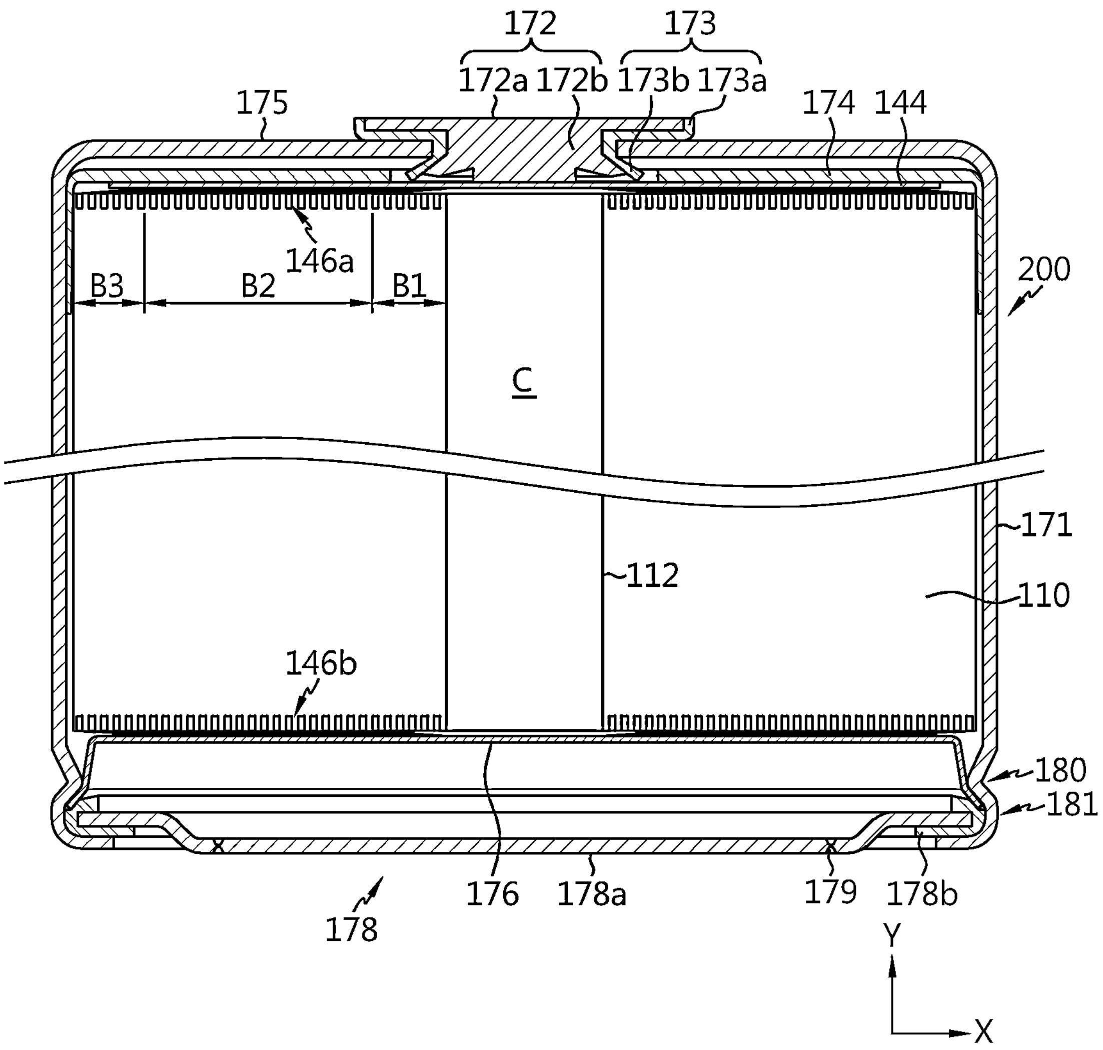
FIG. 17 is a cross-sectional view of the cylindrical battery cell according to another embodiment of the present disclosure, taken along the Y-axis direction.

FIG. 17 is a cross-sectional view of the cylindrical battery cell according to another embodiment of the present disclosure, taken along the Y-axis direction.

Referring to FIG. 17, the cylindrical battery cell 200 includes the electrode assembly 110 illustrated in FIG. 15, and the configuration other than the electrode assembly 110 is substantially the same as the cylindrical battery cell 170 illustrated in FIG. 16.

Referring to FIG. 17, the uncoated portions 146*a*, 146*b* of the electrode assembly 110 are bent in the radial direction of the electrode assembly 110, for example, from the outer circumference toward the core. At this time, since the core-side uncoated portion B1 has a lower height than the other portions, it is not substantially bent. The first current collector plate 144 may be welded to the bent surface of the uncoated portion 146*a*, and the second current collector plate 176 may be welded to the bent surface of the uncoated portion 146*b*.

In the electrode assembly 110, the height of the core-side uncoated portion B1 is relatively lower than that of the other portions. Also, as shown in FIG. 15, in the intermediate uncoated portion B2, the bending length H of the uncoated portion located at the innermost side is equal to or smaller than the radial length R of the core-side uncoated portion B1.

Accordingly, even when the uncoated portions 146*a*, 146*b* are bent toward the core, the cavity 112 of the core of the electrode assembly 110 may be opened upward without being blocked.

If the cavity 112 is not blocked, there is no difficulty in the electrolyte injection process, and the electrolyte solution injection efficiency is improved. In addition, by inserting a welding jig through the cavity 112, the welding process between the second current collector plate 176 and the battery can 171 may be easily performed.

When the uncoated portions 146*a*, 146*b* have a segmented structure, if the width and/or height and/or spacing pitch of the segments are adjusted to satisfy the numerical range of the above-described embodiment, the segments overlap into a plurality of layers enough to sufficiently secure welding strength when the segments are bent and do not form an empty space (gap) on the bent surface. In addition, since the elongation and tensile strength of the current collector 41 are optimized, there is no breaking or cracking between the plurality of segments.

The structures of the uncoated portions 146*a*, 146*b* may be changed to structures according to the above-described embodiments (modifications) differently from those shown in the drawings. In addition, the conventional uncoated portion structure may be applied to either one of the uncoated portions 146*a*, 146*b* without limitation.

The cylindrical battery cell according to the above-described embodiments (modifications) has a structure in which internal resistance is low, internal short circuit is prevented, and welding strength between the current collector plate and the uncoated portion is improved. This battery cell may be used to manufacture a battery pack.

Figure 18:
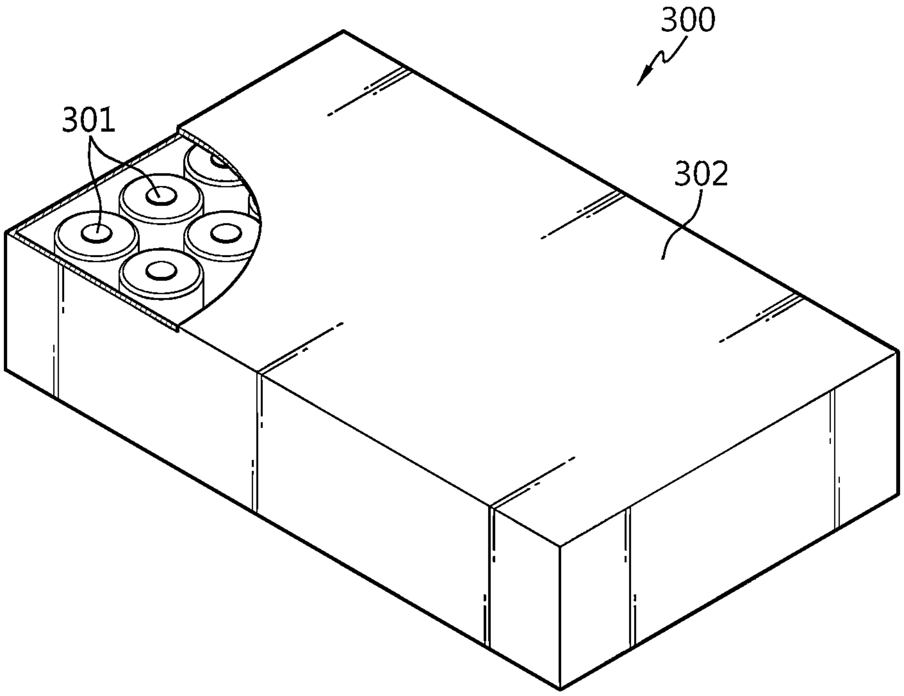
FIG. 18 is a diagram schematically showing the configuration of a battery pack according to an embodiment of the present disclosure.

FIG. 18 is a diagram schematically showing the configuration of a battery pack according to an embodiment of the present disclosure.

The battery pack 300 according to an embodiment of the present disclosure includes an assembly in which cylindrical battery cells 301 are electrically connected, and a pack housing 302 accommodating the same. The cylindrical battery cells 301 may be any one of the battery cells according to the above-described embodiment (modifications). In the drawings, components such as a bus bar for electrically connecting the cylindrical battery cells 301, a cooling unit, and an outer terminal are omitted for convenience of illustration.

Figure 19:
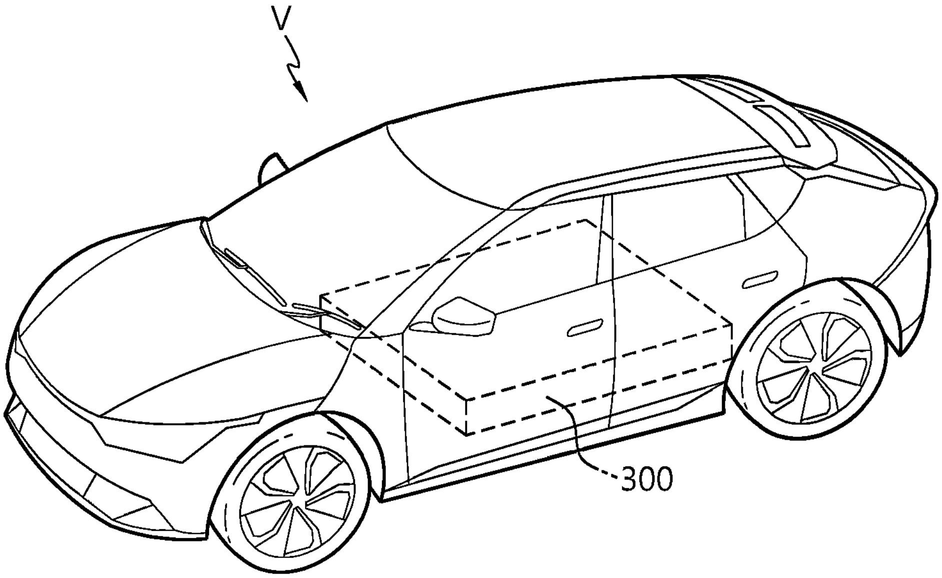
FIG. 19 is a diagram schematically showing a vehicle including the battery pack according to an embodiment of the present disclosure.

The battery pack 300 may be mounted on a vehicle as shown in FIG. 19. FIG. 19 is a diagram schematically showing a vehicle including the battery pack according to an embodiment of the present disclosure. The vehicle may be, for example, an electric vehicle, a hybrid electric vehicle, or a plug-in hybrid electric vehicle. The vehicle includes a four-wheeled vehicle or a two-wheeled vehicle.

Referring to FIG. 19, the vehicle V according to an embodiment of the present disclosure includes the battery pack 300 according to an embodiment of the present disclosure. The vehicle V operates using the power supplied from the battery pack 300 according to an embodiment of the present disclosure.

In addition, even though the present disclosure has been described in detail, it should be understood that the detailed description and specific examples, while indicating preferred embodiments of the disclosure, are given by way of illustration only, since various changes and modifications within the scope of the disclosure will become apparent to those skilled in the art from this detailed description.

[Explanation of signs]

| | |
|---|---|
| 41: | current collector |
| 42: | active material layer |
| 43, 43a, 43b, 146a, 146b: | uncoated portion |
| 44: | insulating coating layer |
| 50, 60, 70: | electrode plate |
| 61, 61': | segment |
| 80, 100, 110, 141: | electrode assembly |
| 102, 112: | cavity |
| 144: | first current collector plate |
| 170, 301: | cylindrical battery cell |
| 171: | battery can |
| 172: | rivet terminal |
| 173: | second gasket |
| 174: | insulation cap |
| 176: | second current collector plate |
| 178: | sealing body |
| 178a: | cap plate |
| 178b: | first gasket |
| 179: | vent portion |
| 180: | beading portion |
| 181: | crimping portion |
| 300: | battery pack |
| 302: | pack housing |
| B1: | core-side uncoated portion |
| B2: | intermediate uncoated portion |
| B3: | outer circumference uncoated portion |
| C: | winding center |
| V: | vehicle |

What is claimed is:

1. An electrode plate for a secondary battery, the electrode plate comprising:

an aluminum current collector for a secondary battery, the current collector having an elongation of 1.5 to 3.0% and a tensile strength of 25 to 35 kgf/mm$^2$; and an active material layer on the current collector, wherein the current collector has a sheet shape with a short side and a long side and includes an uncoated portion not coated with the active material layer at a long side end of the current collector, and wherein a width of the electrode plate along the short side of the current collector is 60 to 110mm, a length of the electrode plate along the long side of the current collector is 3 to 5 m, and a camber length of the electrode plate is less than 20 mm.

2. An electrode assembly, which is a jelly-roll type electrode assembly, comprising a first electrode plate, a second electrode plate, and a separator interposed therebetween, the first electrode plate, the second electrode plate, and the separator being wound in one direction to define a core and an outer circumferential surface of the electrode assembly, wherein each of the first electrode plate and the second electrode plate has a sheet shape having a short side and a long side, wherein at least one of the first electrode plate and the second electrode plate includes an aluminum current collector, an active material layer on the current collector, and an uncoated portion not coated with the active material layer extending along the long side of the current collector, wherein at least a part of the uncoated portion is exposed beyond the separator and used as an electrode tab by itself, wherein the current collector has an elongation of 1.5 to 3.0% and a tensile strength of 25 to 35 kgf/mm$^2$, and wherein a width of the first electrode plate or the second electrode plate along a short side of the current collector is 60 to 110 mm, a length of the first electrode plate or the second electrode plate along a long side of the current collector is 3 to 5 m, and a camber length of the first electrode plate or the second electrode plate is less than 20 mm.

3. The electrode assembly according to claim 2, wherein the uncoated portion includes a core-side uncoated portion adjacent to the core of the electrode assembly, an outer circumference uncoated portion adjacent to the outer circumferential surface of the electrode assembly, and an intermediate uncoated portion located between the core-side uncoated portion and the outer circumference uncoated portion, and wherein at least a partial area of the intermediate uncoated portion is divided into a plurality of segments.

4. The electrode assembly according to claim 3, wherein each segment of the plurality of segments has a shape in which an upper portion has a smaller width than a lower portion.

5. The electrode assembly according to claim 3, wherein the outer circumference uncoated portion and the core-side uncoated portion have no segments in the uncoated portion.

6. The electrode assembly according to claim 3, wherein the plurality of segments are bent in a radial direction of the electrode assembly and overlapped in a plurality of layers.

7. The electrode assembly according to claim 3, wherein no breaking or cracking is included between the plurality of segments.

8. A cylindrical battery cell, comprising: an electrode assembly, which is a jelly-roll type electrode assembly, comprising a first electrode plate, a second electrode plate, and a separator interposed therebetween, the first electrode plate, the second electrode plate, and the separator being wound in one direction to define a core and an outer circumferential surface of the electrode assembly, a battery can having an open end, the battery can being configured to accommodate the electrode assembly therein, the battery can being electrically connected to any one of the first electrode plate and the second electrode plate to have a first polarity;

a sealing body configured to seal the open end of the battery can; and a terminal electrically connected to another one of the first electrode plate and the second electrode plate to have a second polarity, the terminal having a surface exposed outside the battery can, wherein each of the first electrode plate and the second electrode plate has a sheet shape having a short side and a long side, wherein at least one of the first electrode plate and the second electrode plate includes an aluminum current collector, an active material layer on the current collector, and an uncoated portion not coated with the active material layer extending along the long side of the current collector, wherein at least a part of the uncoated portion is exposed beyond the separator and used as an electrode tab by itself, wherein the current collector has an elongation of 1.5 to 3.0% and a tensile strength of 25 to 35 kgf/mm$^2$, and wherein a width of the first electrode plate or the second electrode plate along a short side of the current collector is 60 to 110 mm, a length of the first electrode plate or the second electro de plate along a long side of the current collector is 3 to 5 m, and a camber length of the first electrode plate or the second electrode plate is less than 20 mm.

9. The cylindrical battery cell according to claim 8, wherein the uncoated portion includes a core-side uncoated portion adjacent to the core of the electrode assembly, an outer circumference uncoated portion adjacent to the outer circumferential surface of the electrode assembly, and an intermediate uncoated portion located between the core-side uncoated portion and the outer circumference uncoated portion, and wherein at least a partial area of the intermediate uncoated portion is divided into a plurality of segments.

10. The cylindrical battery cell according to claim 9, wherein no breaking or cracking is included between the plurality of segments.

11. The cylindrical battery cell according to claim 9, wherein at least a partial area of the intermediate uncoated portion is bent from the outer circumference uncoated portion toward the core, wherein a cavity is provided in the core of the electrode assembly, and wherein the cavity is not blocked by the bent intermediate uncoated portion.

12. The cylindrical battery cell according to claim 8, further comprising a current collector plate electrically connected to the uncoated portion of the second electrode plate having the first polarity, at least a part of an edge of the current collector plate being coupled to a sidewall of the battery can.

13. The cylindrical battery cell according to claim 8, wherein the sealing body includes a cap plate having no polarity and a gasket crimped to the open end of the battery can while surrounding an edge of the cap plate.

14. The cylindrical battery cell according to claim 8, wherein the battery can includes a hole in a center portion of a closed surface opposite the open end, and wherein the terminal is a rivet terminal extending through the hole, the terminal being insulated from the battery can and electrically connected to the first electrode plate to have the second polarity.

15. A battery pack, comprising at least one cylindrical battery cell according to claim 8.

16. A vehicle, comprising at least one battery pack according to claim 15.

* * * * *